United States Patent
Yang et al.

(10) Patent No.: US 11,452,167 B2
(45) Date of Patent: Sep. 20, 2022

(54) METHODS AND APPARATUS TO SELECTIVELY MONITOR UPLINK PREEMPTIVE INDICATION FOR SUPPLEMENTARY UPLINK AND NON-SUPPLEMENTARY UPLINK CARRIERS

(71) Applicant: QUALCOMM Incorporated, San Diego, CA (US)

(72) Inventors: Wei Yang, San Diego, CA (US); Seyed Ali Akbar Fakoorian, San Diego, CA (US); Seyedkianoush Hosseini, San Diego, CA (US); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 35 days.

(21) Appl. No.: 16/869,490

(22) Filed: May 7, 2020

(65) Prior Publication Data

US 2020/0359447 A1    Nov. 12, 2020

Related U.S. Application Data

(60) Provisional application No. 62/845,136, filed on May 8, 2019.

(51) Int. Cl.
*H04W 4/00* (2018.01)
*H04W 76/34* (2018.01)
(Continued)

(52) U.S. Cl.
CPC ........... *H04W 76/34* (2018.02); *H04W 24/08* (2013.01); *H04W 72/042* (2013.01);
(Continued)

(58) Field of Classification Search
CPC ... H04W 76/34; H04W 24/08; H04W 72/042; H04W 72/0446; H04W 72/1268; H04W 74/0833
See application file for complete search history.

(56) References Cited

U.S. PATENT DOCUMENTS

2012/0300641 A1*  11/2012  Chen .................... H04L 1/0026
                                                    370/241
2020/0344747 A1*  10/2020  Park ................... H04W 72/1268

OTHER PUBLICATIONS

Vivo: "UL inter-UE Tx prioritization for URLLC" vol. RAN WG1, No. Reno, USA; May 13, 2019-May 17, 2019 May 1, 2019 (May 1, 2019), XP051708191, [retrieved from the Internet May 1, 2019] http://www.3gpp.org/ftp/tsg%5Fran/wG1%5FRL1/TSGR1%5F97/Docs/R1%2D1906150%2Ezip (Year: 2019).*

(Continued)

*Primary Examiner* — Siren Wei
(74) *Attorney, Agent, or Firm* — Procopio, Cory, Hargreaves & Savitch LLP

(57) ABSTRACT

Aspects are provided allowing for selective monitoring of uplink cancellation indication (ULCI) occasions by UEs and allowing UEs to determine from ULCI whether canceled uplink transmission are carried on non-supplementary uplink (NUL) carriers or supplementary uplink (SUL) carriers. A UE may determine not to monitor a ULCI occasion if it does not have an uplink transmission which can be punctured by higher priority data. When the uplink transmission is dynamically scheduled, the UE may determine to monitor a ULCI occasion if the UE receives the uplink grant a certain number of symbols earlier than the ULCI occasion. The base station may configure blocks in downlink control information to indicate the UE should apply ULCI to SUL and/or NUL. The base station may configure the UE to
(Continued)

perform different behaviors after receiving a ULCI depending on whether the portion of the uplink transmission to be canceled is on SUL or NUL.

31 Claims, 25 Drawing Sheets

(51) Int. Cl.
*H04W 72/12* (2009.01)
*H04W 24/08* (2009.01)
*H04W 74/08* (2009.01)
*H04W 72/04* (2009.01)

(52) U.S. Cl.
CPC ... *H04W 72/0446* (2013.01); *H04W 72/1268* (2013.01); *H04W 74/0833* (2013.01)

(56) References Cited

OTHER PUBLICATIONS

Partial International Search Report—PCT/US2020/032238—ISA/EPO—dated Jul. 17, 2020.
Vivo: "UL inter-UE Tx Prioritization for URLLC", 3GPP Draft, 3GPP TSG RAN WG1 #97, R1-1906150, UL Inter-UE Tx Prioritization for URLLC, 3RD Generation Partnership Project (3GPP), Mobile Competence Centre, 650, Route Des Lucioles, F-06921, Sophia-Antipolis Cedex, France, vol. RAN WG1, No. Reno, USA; May 13, 2019-May 17, 2019, May 1, 2019 (May 1, 2019), XP051708191, 13 pages, Retrieved from the Internet:URL:http://www.3gpp.org/ftp/tsg%5Fran/WG1%5FRL1/TSGR1%5F97/Docs/R1%2D1906150%2Ezip [retrieved on May 1, 2019], the whole document.
Apple Inc: "Discussion on Handling of UL Multiplexing of Transmissions with Different Reliability", 3GPP Draft, 3GPP TSG RAN WG1 Meeting #92, R1-1802289, No. Athens, Greece, Feb. 26, 2018-Mar. 2, 2018, Feb. 17, 2018 (Feb. 17, 2018), XP051397819, 5 Pages, Retrieved from Internet: URL: http://www.3gpp.org/ftp/tsg%5Fran/WG1%5FRL1/TSGR1%5F92/Docs/ [retrieved on Feb. 17, 2018] Design Consideration for UL URLLC multiplex with eMBB, p. 2, paragraph 2, UL preemption for service multiplexing in TDD system, p. 4, paragraph 4.
International Search Report and Written Opinion—PCT/US2020/032238—ISA/EPO—dated Oct. 2, 2020.
Qualcomm Incorporated: "Uplink Inter-UE Tx Multiplexing and Prioritization", 3GPP Draft, 3GPP TSG-RAN WG1 #97, R1-1907285, vol. RAN WG1, No. Reno, Nevada, USA, May 13, 2019-May 17, 2019, May 13, 2019 (May 13, 2019), XP051728725, 7 Pages, Retrieved from the Internet: URL:http://www.3gpp.org/ftp/Meetings%5F3GPP7o5FSYNC/RAN1/Docs/R1%2D1907285%2Ezip [retrieved on May 13, 2019], Sections 2.2, 2.3 and 2.4.

\* cited by examiner

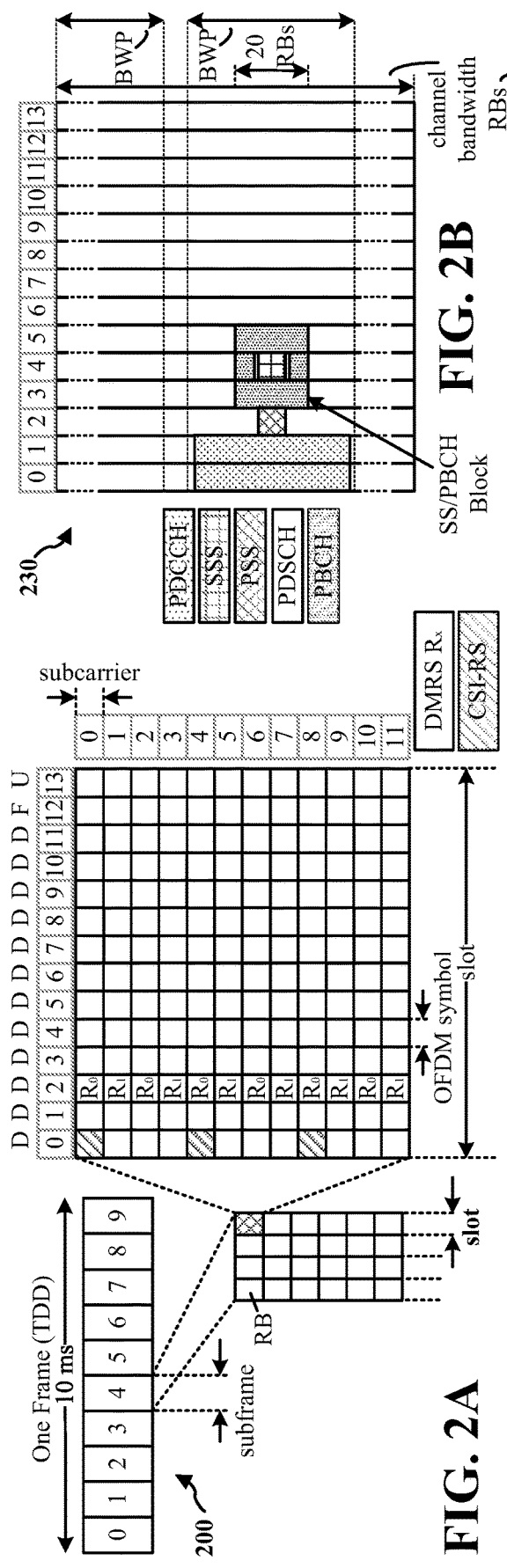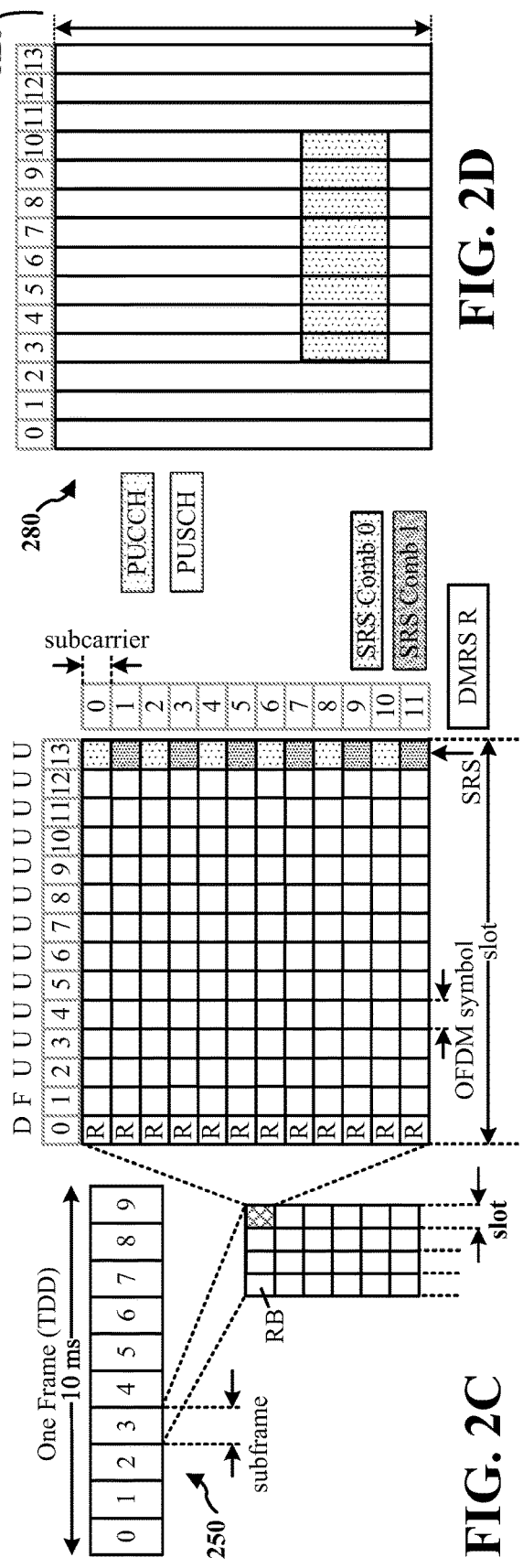

METHODS AND APPARATUS TO SELECTIVELY MONITOR UPLINK PREEMPTIVE INDICATION FOR SUPPLEMENTARY UPLINK AND NON-SUPPLEMENTARY UPLINK CARRIERS

CROSS REFERENCE TO RELATED APPLICATION(S)

This application claims the benefit of U.S. Provisional Application Ser. No. 62/845,136, entitled "METHODS AND APPARATUS TO SELECTIVELY MONITOR UPLINK PREEMPTIVE INDICATION FOR SUPPLEMENTARY UPLINK AND NON-SUPPLEMENTARY UPLINK CARRIERS" and filed on May 8, 2019, which is expressly incorporated by reference herein in its entirety.

BACKGROUND

Technical Field

The present disclosure relates generally to communication systems, and more particularly, to a wireless scheduling between a base station and a user equipment (UE).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

After a base station schedules resources for a UE to use in transmission or reception, e.g., of enhanced mobile broadband (eMBB) data, the base station may become aware of a more urgent, higher priority transmission from another UE (e.g. a latency sensitive device) requiring ultra-reliable, low latency communication (URLLC). In such case, the base station may reclaim the resources previously scheduled to the first, lower priority UE for use by the second, higher priority UE. In particular, if the previously scheduled resources are for a downlink transmission, the base station may send a downlink cancellation indication (DLCI) (or downlink preemption indication) in a DLCI occasion to the first UE cancelling at least a portion of the downlink transmission to that UE. Similarly, if the previously scheduled resources are for an uplink transmission, the base station may send an uplink cancellation indication (ULCI) (or uplink preemption indication) in an ULCI occasion to the first UE to cancel at least a portion of the uplink transmission from that UE. The base station may then allocate those reclaimed resources to the higher priority, latency sensitive UE.

However, while the UE may infrequently monitor DLCI occasions since the base station itself cancels portions of eMBB transmissions in favor of URLLC data, ULCI occasions may occur more frequently, in order to inform the UE when to cancel portions of its uplink transmissions. For example, a UE may monitor ULCI occasions multiple times per slot, in contrast to DLCI occasions. This frequent monitoring of ULCI occasions may impose a large power consumption burden on the UE, as well as affect the UE's ability to send its own traffic to the base station. Aspects presented herein allow UEs to selectively monitor ULCI occasions, or determine whether to skip monitoring unnecessary ULCI occasions, in order to reduce power consumption burden on the UEs. Similarly, aspects presented herein allow base stations to send ULCI occasions at times corresponding to the selective monitoring of UEs to improve system performance and minimize misaligned transmission and reception of ULCI occasions.

The present disclosure provides a solution to power consumption needs while improving communication between a base station and UE by providing for selective monitoring of ULCI occasions by UEs and corresponding transmission of ULCI occasions by a base station. Aspects may include rules that may be dependent on whether a previously scheduled uplink transmission is semi-statically scheduled (e.g. RRC configured), or dynamically scheduled (e.g. in a downlink control information (DCI)). In a first aspect, regardless of whether the uplink transmission is semi-statically or dynamically scheduled, the UE may determine not to monitor a ULCI occasion if the UE does not have a previously scheduled uplink transmission that can be punctured by URLLC data or other higher priority data. Rather, the UE may determine to monitor ULCI occasions if the base station has previously scheduled an uplink transmission for the UE that could potentially be punctured or canceled by an ULCI. In a second aspect, when the uplink transmission is dynamically scheduled by an uplink grant, the UE may need some processing time to receive and decode the uplink grant. Therefore, the UE may determine to monitor a ULCI occasion if the UE receives the uplink grant at least a certain number of symbols earlier than the ULCI occasion associated with that uplink transmission.

Additionally, a UE may be configured with two uplink carriers in the same uplink serving cell, namely a supplementary uplink (SUL) carrier and a non-supplementary uplink (NUL) carrier, and the base station may semi-statically or dynamically schedule uplink transmissions on either the NUL or SUL. Aspects presented herein enable the UE to determine whether the UE should apply the ULCI to cancel uplink transmissions on NUL or SUL. For example, the ULCI may indicate whether the uplink transmission to be canceled is carried on NUL or SUL.

Aspects of the present disclosure allow the UE to determine from ULCI received from the base station whether the uplink transmission to be canceled is carried on NUL or SUL. The base station may configure separate blocks in DCI to indicate the UE should apply ULCI to either SUL, NUL, or both. The base station may save signaling overhead by configuring only one block in DCI to indicate the UE should apply ULCI to SUL and NUL, although only one of SUL and NUL may include the uplink transmission. The base station may configure the UE to perform different behaviors after receiving a ULCI (e.g. stopping the uplink transmission without resuming subsequent uplink transmissions, stopping the uplink transmission and resuming subsequent uplink transmissions, and reducing uplink transmission power) depending on whether the portion of the uplink transmission to be canceled is on SUL or NUL.

In an aspect of the disclosure, a method, a computer-readable medium, and an apparatus are provided. The apparatus may be a UE. The apparatus receives scheduling information for an uplink transmission from a base station and determines whether to monitor at least one uplink cancellation indication (ULCI) occasion from the base station based on the scheduling information and based on a separation in time between the scheduling information and the ULCI occasion.

In a further aspect of the disclosure, a method, a computer-readable medium, and an apparatus are provided. The apparatus may be a UE. The apparatus receives scheduling information for an uplink transmission from a base station, and receives a configuration to monitor at least one block of an uplink cancellation indication (ULCI) occasion from the base station based on the scheduling information, where the ULCI comprises multiple blocks, and where the configuration indicates at least one of a first block corresponding to a SUL carrier in a cell or a second block corresponding to a NUL carrier in the cell.

In another aspect of the disclosure, a method, a computer-readable medium, and an apparatus are provided. The apparatus may be a base station. The apparatus schedules a UE for an uplink transmission; determines whether the UE will monitor an ULCI occasion for the uplink transmission based on a separation in time between the scheduling and the ULCI occasion; and transmits an ULCI at the ULCI occasion, the ULCI cancelling at least a portion of the uplink transmission, if the UE will monitor the ULCI occasion.

In an additional aspect of the disclosure, a method, a computer-readable medium, and an apparatus are provided. The apparatus may be a base station. The apparatus configures a UE to monitor at least one block of an ULCI, where the configuring indicates at least one of a first block corresponding to a SUL carrier in a cell or a second block corresponding to a NUL carrier in the cell; and schedules a UE for an uplink transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
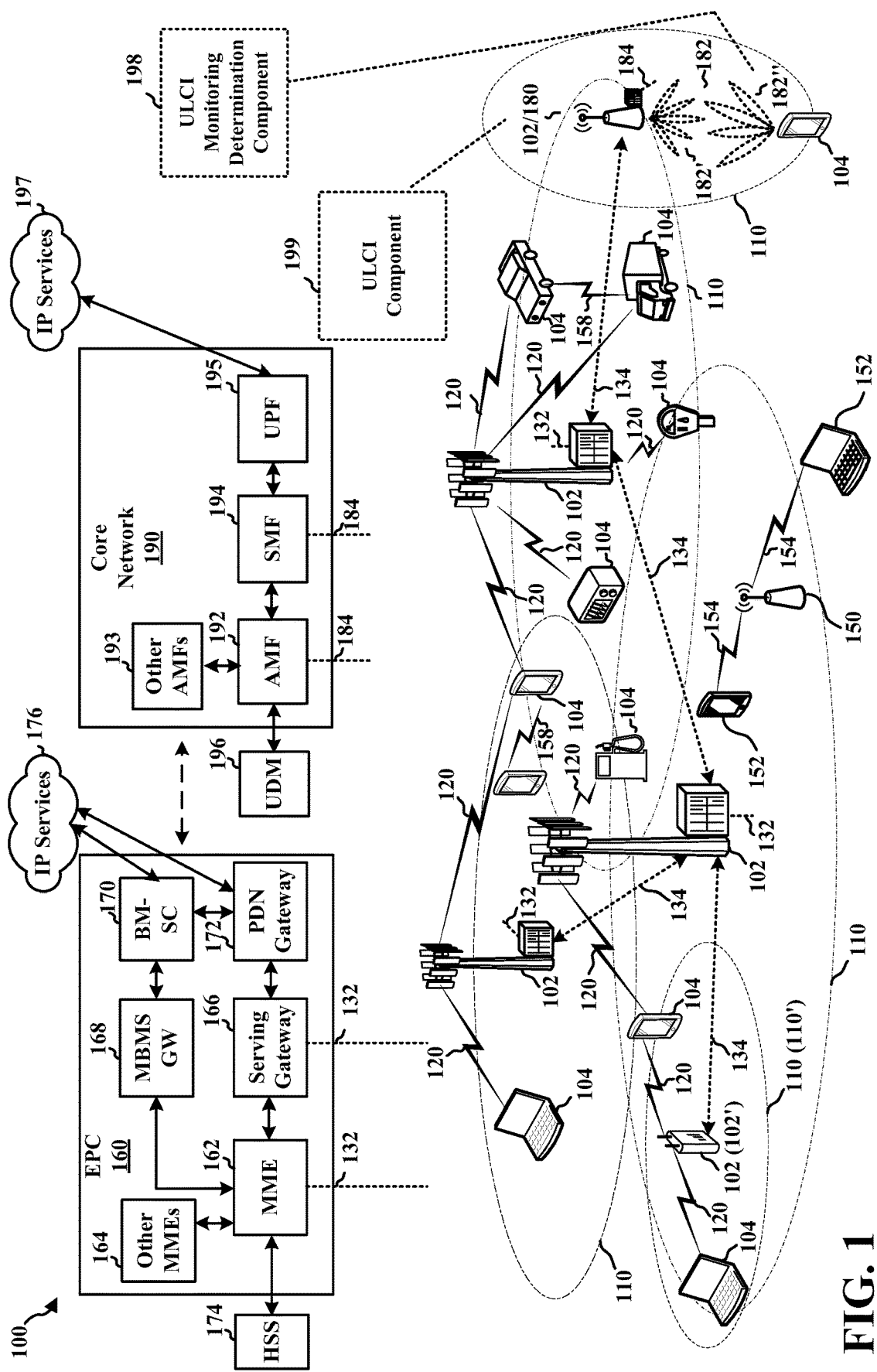
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a ULCI monitoring determination component 198 configured to receive scheduling information for an uplink transmission from a base station; and determine whether to monitor at least one ULCI occasion from the base station based on the scheduling information and based on a separation in time between the scheduling information and the ULCI occasion. The ULCI monitoring determination component 198 may also be configured to receive scheduling information for an uplink transmission from a base station, determine whether to monitor at least one ULCI occasion from the base station based on the scheduling information, where an ULCI comprises multiple blocks, and receive a configuration to monitor at least one block of the ULCI, where the configuration indicates at least one of a first block corresponding to a SUL carrier in a cell or a second block corresponding to a NUL carrier in the cell.

Still referring to FIG. 1, in other aspects, the base station 180 may include an ULCI component 199 configured to schedule a UE for an uplink transmission; determine whether the UE will monitor ULCI occasion for the uplink transmission based on a separation in time between the scheduling and the ULCI occasion; and transmit an ULCI at the ULCI occasion, the ULCI cancelling at least a portion of the uplink transmission, if the UE will monitor the ULCI occasion. The ULCI component 199 may also configure a UE to monitor at least one block of an ULCI, where the configuring indicates at least one of a first block corresponding to a SUL carrier in a cell or a second block corresponding to a NUL carrier in the cell; schedule a UE for an uplink transmission; determine whether the UE will monitor an ULCI occasion for the uplink transmission; and transmit an ULCI at the ULCI occasion, the ULCI cancelling at least a portion of the uplink transmission, if the UE will monitor the ULCI occasion.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and 2µ slots/subframe. The subcarrier spacing and symbol length/duration are a function of the numerology. The subcarrier spacing may be equal to $2^{\mu}*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
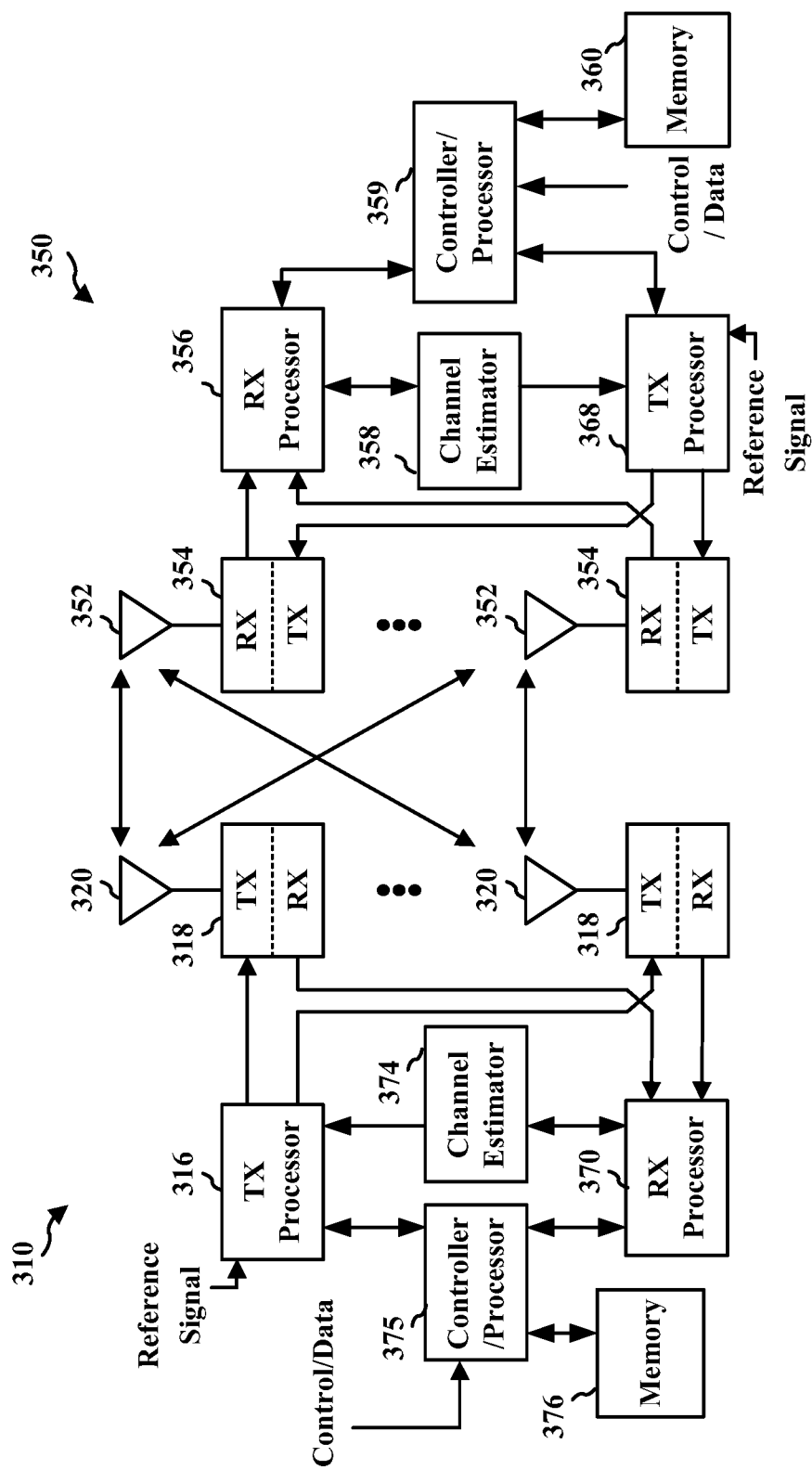
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1, e.g., determining whether to monitor at least one ULCI occasion from the base station based on uplink scheduling information.

At least one of the TX processor 316, the RX processor 370, and the controller/processor 375 may be configured to perform aspects in connection with 199 of FIG. 1, e.g., determining when to transmit ULCI based on whether a UE will monitor a particular ULCI occasion.

After a base station schedules resources for a UE to use in transmission or reception, e.g., of eMBB data, the base station may become aware of a more urgent, higher priority transmission from another UE. For example, the other transmission may be from a latency sensitive device requiring URLLC. In such circumstances, the base station may reclaim the resources previously scheduled to the first, lower priority UE for use by the second, higher priority UE. In particular, if the previously scheduled resources are for a downlink transmission, the base station may send a DLCI (or downlink preemption indication) in a DLCI occasion to the first UE cancelling at least a portion of the downlink transmission to that UE. Similarly, if the previously scheduled resources are for an uplink transmission, the base station may send an ULCI (or uplink preemption indication) in an ULCI occasion to the first UE to cancel at least a portion of the uplink transmission from that UE. The base station may then allocate those reclaimed resources to the higher priority, latency sensitive UE.

Figure 4:
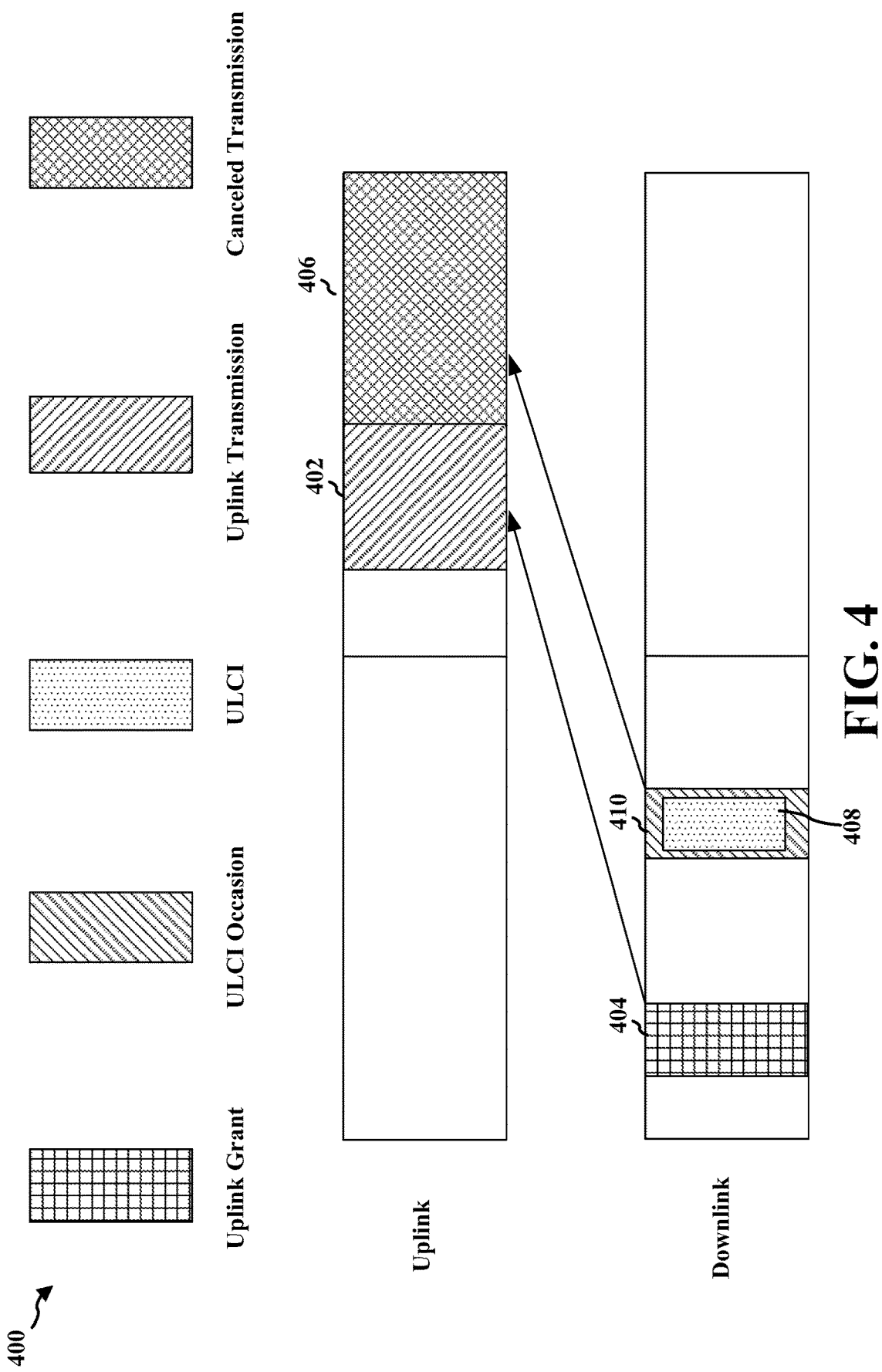
FIG. 4 is a diagram illustrating the allocation of resources for an uplink transmission of a UE based on an uplink grant received from a base station.

For example, FIG. 4 illustrates an example of a diagram 400 illustrating the allocation of resources for an uplink transmission 402 of a UE based on an uplink grant 404 received from a base station. If the base station later becomes aware of a latency sensitive UE which requires at least a portion 406 of the allocated resources for the uplink transmission 402 for URLLC data or other higher priority data, the base station may transmit a ULCI 408 in a ULCI occasion 410 to the UE indicating that the portion 406 of the previously granted resources for the uplink transmission will be punctured for use by the latency sensitive UE. As a result, the UE cancels its uplink transmission during portion 406 for use by the other UE.

Figure 5:
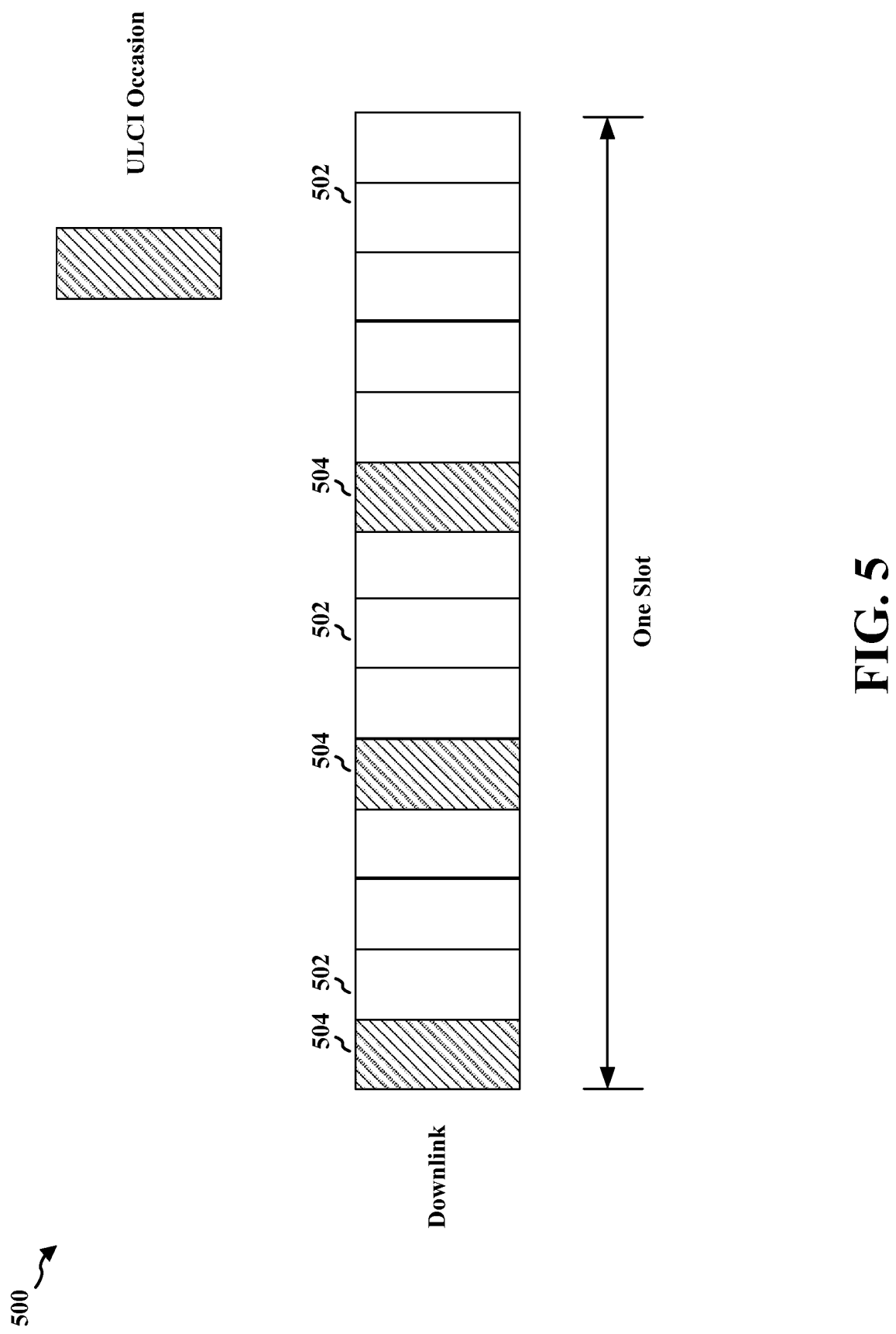
FIG. 5 is a diagram illustrating an example frame structure including multiple symbols in which the UE may receive multiple ULCI occasions.

A UE may infrequently monitor DLCI occasions because the base station itself cancels portions of eMBB transmissions in favor of URLLC data. However, the UE may monitor ULCI occasions more frequently, in order to know when to cancel portions of its eMBB transmissions in favor of the URLLC data. For example, a UE may monitor ULCI occasions multiple times per slot, in contrast to DLCI occasions. For instance, FIG. 5 illustrates an example frame structure 500 including multiple symbols 502 (in this configuration, fourteen symbols in a single slot) in which UE multiple ULCI occasions 504 may occur in the slot. Each ULCI occasion might include a ULCI for canceling at least a portion of one or more previously scheduled uplink transmissions. Frequent monitoring of ULCI occasions may impose a large power consumption burden on the UE, as well as affect the UE's ability to send its own traffic to the base station. Aspects presented herein enable the UE to selectively monitor ULCI occasions, or determine whether to skip monitoring unnecessary ULCI occasions, in order to reduce power consumption burden on the UEs. Aspects presented herein also enable base stations to send ULCI occasions at times corresponding to the selective monitoring of UEs in order to improve system performance and minimize misaligned transmission and reception of ULCI occasions.

Aspects of the present application provide rules for selective monitoring of ULCI occasions by UEs and corresponding transmission of ULCI occasions by a base station. The rules may be dependent on whether a previously scheduled uplink transmission is semi-statically scheduled (e.g. RRC configured), or dynamically scheduled (e.g. in a downlink control information (DCI)). In a first aspect, regardless of whether the uplink transmission is semi-statically or dynamically scheduled, the UE may not monitor a ULCI occasion if the UE does not have a previously scheduled uplink transmission that can be punctured by URLLC data or other higher priority data. Rather, the UE may only monitor ULCI occasions if the base station has previously scheduled an uplink transmission for the UE that could potentially be punctured or canceled by an ULCI. Details of this aspect are described with respect to FIGS. 6 and 7, infra. When the uplink transmission is dynamically scheduled by an uplink grant, the UE may need some processing time to receive and decode the uplink grant. Therefore, the UE may not monitor a ULCI occasion if the UE does not receive the uplink grant at least a certain number of symbols earlier than the ULCI occasion associated with that uplink transmission. Details of this aspect are described with respect to FIGS. 8 and 9, infra.

Figure 10:
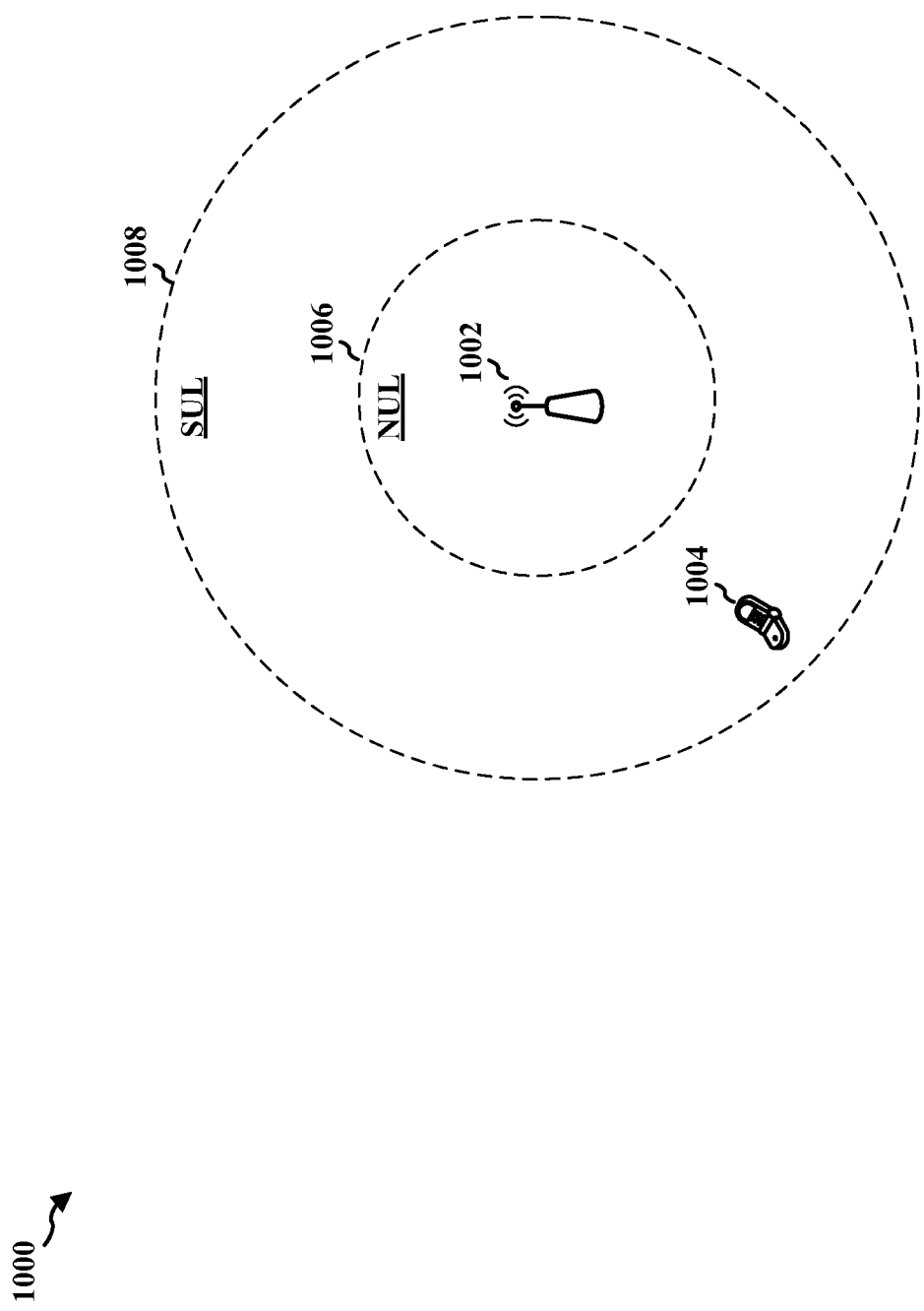
FIG. 10 is a diagram of an example serving cell including a NUL and SUL carrier for a UE.

Additionally, a UE may be configured with two uplink carriers in the same uplink serving cell, namely a SUL carrier and a NUL carrier, and the base station may semi-statically or dynamically schedule uplink transmissions on either the NUL or SUL. For example, FIG. 10 illustrates an example serving cell 1000 in which a base station 1002 may communicate with a UE 1004 over a NUL carrier 1006 and a SUL carrier 1008. The NUL carrier 1006 and SUL carrier 1008 may be located on different frequencies; for example, the NUL carrier 1006 may be located at a higher frequency than SUL carrier 1008. The NUL carrier 1006 and the SUL carrier 1008 may have different ranges, e.g., as illustrated in FIG. 10. The base station 1002 may send an uplink grant to the UE 1004 to communicate on either the NUL or the SUL; the UE may not simultaneously transmit uplink communications on NUL and SUL.

When the base station sends ULCI to the UE to cancel a previously scheduled uplink transmission, aspects presented herein enable the UE to determine whether to apply the ULCI to cancel uplink transmissions on NUL or SUL. Aspects may enable the ULCI to indicate whether the uplink transmission to be canceled is carried on NUL or SUL.

Aspects presented herein enable the UE to determine from ULCI received from the base station whether the uplink transmission to be canceled is carried on NUL or SUL. Thus, in addition to or alternatively to the selective monitoring of ULCI described in connection FIGS. 6-9, the base station may configure separate blocks in DCI to indicate the UE should apply ULCI to either SUL, NUL, or both. The base station may save signaling overhead by configuring only one block in DCI to indicate the UE should apply ULCI to SUL and NUL, although only one of SUL and NUL may include the uplink transmission. Details of these aspects are described with respect to FIGS. 11 and 12, infra. Additionally or alternatively, the base station may configure the UE to perform different behaviors after receiving a ULCI (e.g. stopping the uplink transmission without resuming subsequent uplink transmissions, stopping the uplink transmission and resuming subsequent uplink transmissions, and reducing uplink transmission power) depending on whether the portion of the uplink transmission to be canceled is on SUL or NUL. Example details of this aspect are described with respect to FIG. 13, infra.

Figure 6:
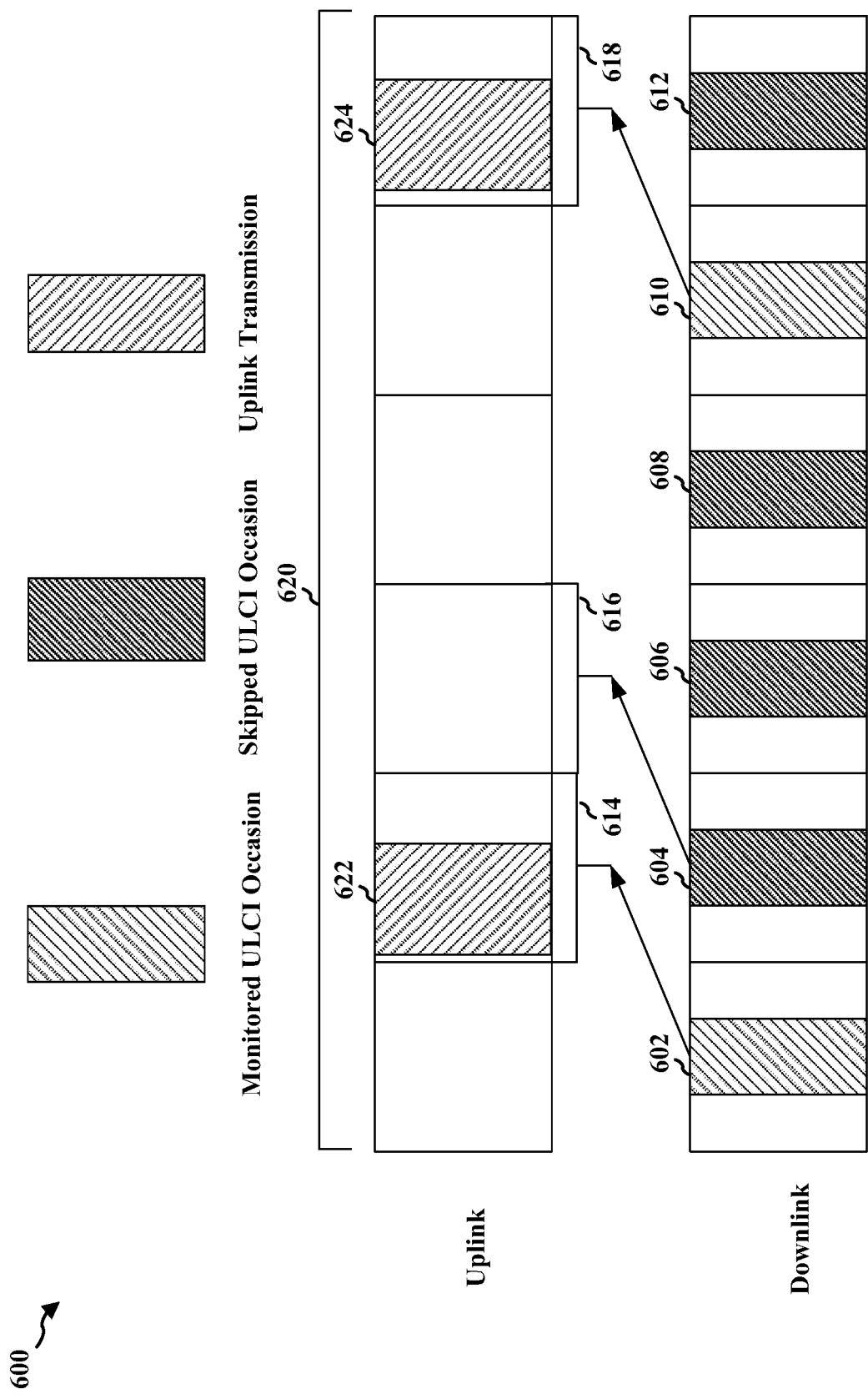
FIG. 6 is a transmission diagram illustrating an example of downlink and uplink communication to and from a UE.
Figure 7:
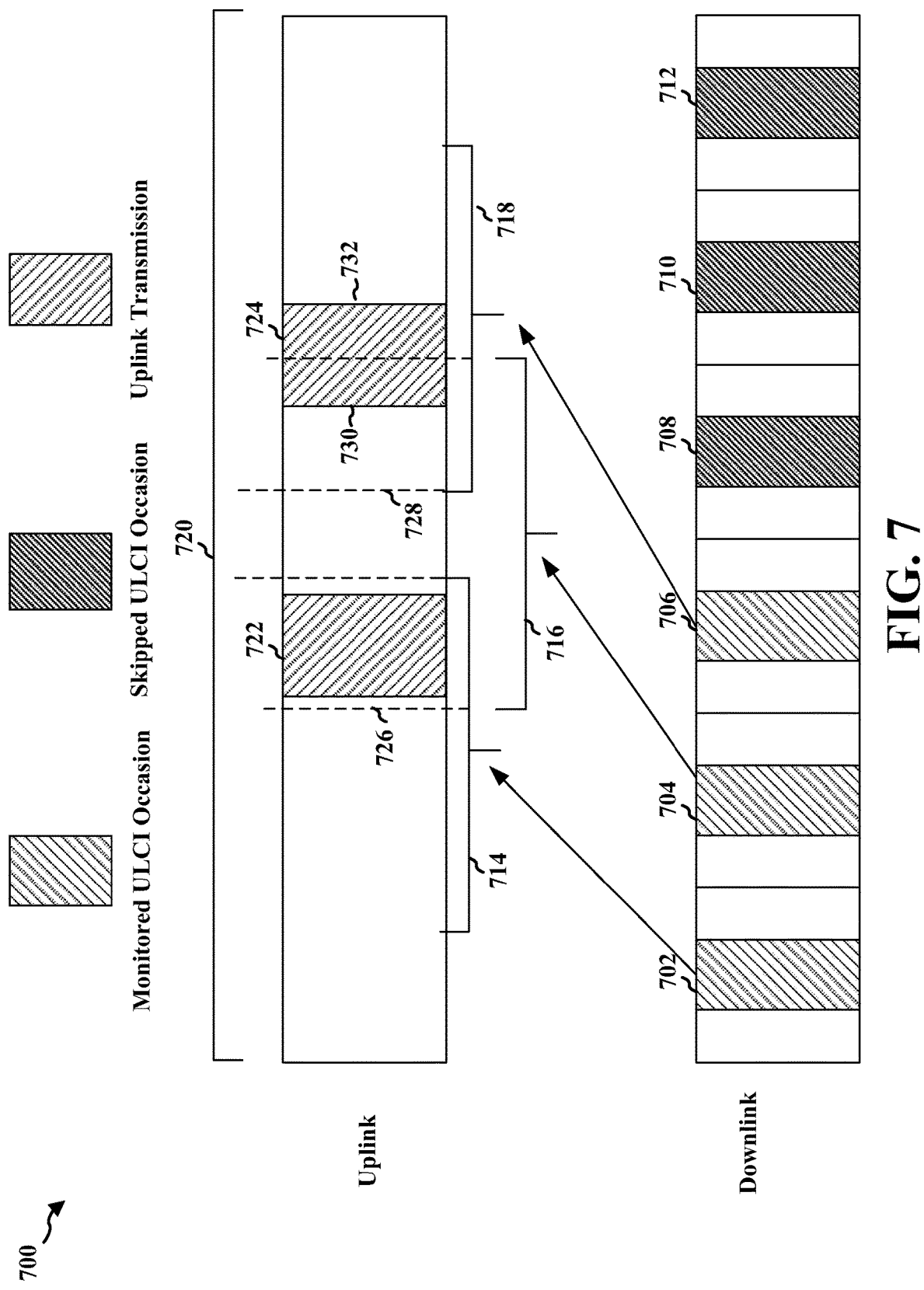
FIG. 7 is a transmission diagram illustrating an example of downlink and uplink communication to and from a UE.

Referring now to the first aspect and FIGS. 6 and 7, each ULCI in a ULCI occasion may be associated with a certain set of time domain resources (i.e. a window). The base station may inform the UE regarding which set of time domain resources, or window of uplink resources, corresponds to each ULCI occasion. For example, the base station may indicate the set of time domain resources for each ULCI occasion in RRC signaling. As one example, a base station may RRC configure multiple sets of time-domain resources for ULCI, and may dynamically indicate to which of the sets of time-domain resources the UE shall apply the ULCI. In this case, the UE shall assume that the time domain resources that the ULCI applies to is the union of all of the RRC configured time domain resources to which the ULCI may potentially be applied.

There may be different types of ULCI indications. One example of ULCI indication may comprise a bitmap type of indication. Another type of ULCI indication may comprise a dynamic start-and-length type of indication. In a bitmap type ULCI indication, each bit in the bit map may correspond to a sub-set (e.g., one symbol) of the uplink time-domain resources to which the ULCI applies. Therefore, a base station may configure one set of time domain resources for each ULCI occasion, and can dynamically signal whether each sub-set of resources are punctured or not via the bit-map.

In a dynamic start-and-length type of ULCI indication, however, signaling may be similar to the signaling of time-domain resources for dynamic PUSCH/PDSCH signaling in NR. Thus, the base station may signal the starting symbol of the time domain resources to be punctured by the ULCI, along with the length of the time domain resources to be punctured by the ULCI. Therefore, a UE may determine the union of all time domain resources that could potentially be covered by a ULCI, when it determines whether it monitors the ULCI occasion or not. For example, suppose a given ULCI can signal one of two possible cancelling patterns: a first pattern cancels transmissions on symbol 3 to 5 of a slot, and a second pattern cancels transmissions on symbol 6 to 8 of a slot. In this case, the total time domain resources that can be covered by this ULCI is symbol 3 to 8 of the slot. Therefore, if the eMBB UE has any uplink transmission that has at least one symbol in symbol 3 to 8 in this slot, UE may determine to monitor this ULCI occasion.

In another example, the base station may indicate multiple time domain resources by RRC configuring two or more time domain durations: e.g., a one-slot duration and a two-slot duration. The base station may then dynamically indicate whether a particular ULCI applies to one slot or two slots, when it sends out the ULCI signaling [e.g., using 1 bit signaled in the ULCI in addition to the existing fields]. In this case, prior to the reception of the ULCI, the UE might not know whether the ULCI will be effective for one slot or two slots. Therefore, the UE may prepare for the potential circumstance in which is the ULCI covers two slots.

For example, FIG. 6 illustrates a transmission diagram 600 in which a UE may potentially receive multiple ULCI occasions 602, 604, 606, 608, 610, 612 from a base station, with each ULCI occasion corresponding to individual windows 614, 616, 618, etc. of a combined set of resources 620 for use by uplink transmissions 622, 624. Thus, ULCI occasion 602 may be associated with the set of time domain resources within window 614, ULCI occasion 604 may be associated with the set of time domain resources within window 616, and so forth. Each window may span, for instance, multiple symbols in the combined set of resources 620.

According to this aspect, the UE may monitor an ULCI occasion if the base station has previously scheduled an uplink transmission having at least one symbol falling into the corresponding window. The UE may determine to skip monitoring an ULCI occasion if the UE is not scheduled for an uplink transmission during the window associated with the ULCI occasion. For example, FIG. 6 illustrates the base station having previously scheduled uplink transmissions 622, 624 respectively using the sets of time domain resources within windows 614 and 618, but not within window 616. Therefore, since uplink transmissions 622 and 624 both include at least one symbol only within windows 614 and 618, the UE may monitor the ULCI occasions associated with those windows (i.e. ULCI occasions 602 and 610), and the UE may skip monitoring the ULCI occasions associated with the remaining windows (e.g. ULCI occasions 604, 606, 608, and 612). By skipping monitoring these ULCI occasions, the UE can reduce power consumption. In an example, all of the uplink transmissions in FIG. 6 may be configured PUSCH transmissions, e.g., based on a configured grant that triggers a sequence of uplink transmissions or semi-persistently scheduled uplink transmissions. The UE may be configured with a PUSCH transmission having a configured grant that has a large periodicity, e.g., one PUSCH transmission in every 10 slots. The UE may only monitor the ULCI occasion prior to each configured PUSCH occasion and may skip other ULCI occasions between PUSCH occasions.

Similarly, the base station may refrain from transmitting ULCI to a given UE for windows in which the base station has not previously scheduled the UE for at least one symbol of an uplink transmission. For example, in FIG. 6, the base station has not scheduled the UE for uplink transmissions in window 616. Therefore, the base station may refrain from transmitting ULCI for the given UE in ULCI occasion 604. Likewise, the base station may refrain from sending ULCI for the UE in the other ULCI occasions for which the UE will skip monitoring (e.g. ULCI occasions 606, 608, and 612), thus preventing a waste of resources from sending unnecessary ULCI occasions, improving system performance, and preventing misalignment of transmission/reception of ULCI occasions.

In another aspect, the UE may monitor an ULCI occasion if the previously scheduled uplink transmission is allowed to be punctured or canceled by the ULCI. There are different types of uplink transmissions. For example, the uplink transmission may comprise any of PUSCH, PUCCH, SRS, PRACH, etc. In some cases, not all of the uplink transmissions may be punctured or canceled by the ULCI. For example, a PRACH transmission may be limited from being affected by the ULCI. Thus, if the UE has a PRACH transmission scheduled, the UE may determine not to monitor the ULCI, because the transmission is not capable of being punctured or canceled even if a ULCI were received. In an example, PUSCH transmissions may be able to be canceled or punctured by the ULCI, and the other types of uplink transmissions may not be able to be punctured or canceled by the ULCI. In some cases, if the scheduled uplink transmission is itself URLLC data or other high priority data, that data may not be cancellable by a ULCI, and therefore, the UE may skip monitoring the ULCI occasion for that uplink transmission. The base station may indicate to the UE whether a scheduled uplink transmission is allowed to be canceled by ULCI (e.g. in downlink control information (DCI), RRC signaling, and/or a MAC control element). Thus, referring to the example of FIG. 6, uplink transmission 622 may be eMBB data transmitted by the UE which may be canceled in response to a ULCI, while uplink transmission 624 may be URLLC data or other higher priority data transmitted by the UE which may not be canceled in response to a ULCI. In such case, the UE may monitor ULCI occasion 602, but may skip monitoring ULCI occasion 610.

In further aspects, the scheduled uplink transmission may be on the same serving cell as its associated ULCI occasion, or on a different serving cell than its associated ULCI occasion. When the base station schedules an uplink transmission for a UE, the base station may indicate which cell will be used for the uplink transmission in a field of the DCI. For example, referring to FIG. 6, the base station may schedule and the UE may transmit uplink transmission 622 in the same cell that the ULCI occasion 602 is transmitted/ received, while the base station may schedule and the UE may transmit uplink transmission 624 in a different cell than the cell in which the ULCI occasion 610 is transmitted/ received. Thus, after selectively monitoring ULCI occasions 602 and 610, the UE may cancel at least a portion of uplink transmission 622, 624 in their corresponding cells.

In certain aspects of the first aspect, multiple ULCI occasions may be associated with the same symbol of a previously scheduled uplink transmission, and the UE may monitor the multiple ULCI occasions. In other words, the sets of different resources (e.g. windows) may overlap. For example, FIG. 7 illustrates an example of a transmission diagram 700 in which a UE may receive multiple ULCI occasions 702, 704, 706, 708, 710, 712 from a base station that each correspond to individual windows 714, 716, 718, etc. of a combined set of resources 720 for use by uplink transmissions 722, 724. Thus, ULCI occasion 702 may be associated with the set of time domain resources within window 714, ULCI occasion 704 may be associated with the set of time domain resources within window 716, and so forth. However, unlike the example of FIG. 6, here the windows 714, 716, 718 may overlap in time. For example, the windows may span longer in time than the associated ULCI occasions 702, 704, and 706 are separated in time, resulting in windows 714, 716 overlapping at section 726 and windows 716, 718 overlapping at section 728.

In such case, if the base station has previously scheduled uplink transmissions having at least one symbol within an overlapping section, the UE may monitor the ULCI occasions associated with the windows of both of the overlapping sections. For example, FIG. 7 illustrates the base station having previously scheduled uplink transmission 722 using the sets of time domain resources in overlapping section 726, and uplink transmission 724 using the sets of time domain resources in overlapping section 728 and window 718. Therefore, since uplink transmission 722 includes at least one symbol within windows 714 and 716, the UE may monitor the ULCI occasions associated with those windows (i.e. ULCI occasions 702 and 704). Similarly, as uplink transmission 724 includes at least one symbol within windows 716 and 718, the UE may monitor the ULCI occasions associated with those windows (i.e. ULCI occasions 704 and 706). The UE may skip monitoring the ULCI occasions associated with the remaining windows (e.g. ULCI occasions 708, 710, and 712).

In other aspects, multiple ULCI occasions may be associated with different portions of the same, scheduled uplink transmission, and the UE may monitor the multiple ULCI occasions. For example, referring to FIG. 7, different portions 730, 732 of uplink transmission 724 respectively include at least one symbol within windows 716 and 718, and therefore the UE may monitor at least one ULCI occasion for portion 730 and at least one other ULCI occasion for portion 732. Where at least one portion is in an overlapping section, the UE may monitor a different number of ULCI occasions for each portion. For instance, as portion 730 is in overlapping section 728, the UE may monitor two ULCI occasions for portion 730 of uplink transmission 724 (i.e. ULCI occasions 704 and 706) while only one ULCI occasion (i.e. ULCI occasion 706) for portion 732 of uplink transmission 724. As another example, if the first portion 730 is canceled by ULCI in ULCI occasion 704, then the UE may also cancel the remaining portion 732. In this case, since the portion of the uplink transmission 732 is already canceled, the UE may determine not to monitor ULCI occasion 706. Thus, the power consumption burden imposed on the UE from frequent monitoring of ULCI may be further reduced. For example, if some symbols of uplink transmission 730 in the overlap 728 between uplink resources 716 and uplink resources 718 are canceled, and if the UE is configured to perform stopping the uplink transmission 724 without resuming, all subsequent transmissions after the canceled symbols will also be canceled. For example, if first portion 730 is canceled, the UE may also cancel second portion 732. In this example, the UE may determine not to monitor ULCI occasion 718, because all symbols of uplink transmission 724 that fall in the window 718 would already be canceled.

For example, two ULCI occasions could correspond to overlapping uplink time domain resources, and the UL transmission might not occur in the resources that are covered by the second ULCI occasion. In FIG. 7 for example, the ULCI in ULCI occasion 702 and ULCI in ULCI occasion 704 cover overlapping uplink transmission resources, e.g., at overlap 726 of resources 714 and resources 716. The UL transmission 722 may occur fully within the overlapping portion 726. In this case, the UE may monitor ULCI occasion 702. If ULCI in ULCI occasion 702 indicates to the UE to cancel the uplink transmission 722, then the UE may determine not to monitor the ULCI occasion 704 because the uplink transmission is already canceled. However, if ULCI in ULCI occasion 702 does not cancel the uplink transmission 722, then UE may determine to monitor ULCI occasion 704, because base station may use ULCI occasion 704 to cancel the uplink transmission 722. The UE may make such determinations if a future ULCI occasion does not resume a transmission that is already canceled by a previous ULCI, and/or if a ULCI does not cancel future (unscheduled) transmissions. Thus, if the UE receives an ULCI to indicate a symbol of an uplink transmission is to be canceled, the UE may not expect to be scheduled with an uplink transmission later on this symbol.

In another example, UL transmission 722 may have at least one symbol in the window 716 that is not overlapping with window 714, e.g., outside of the overlapping region 726.

Figure 8:
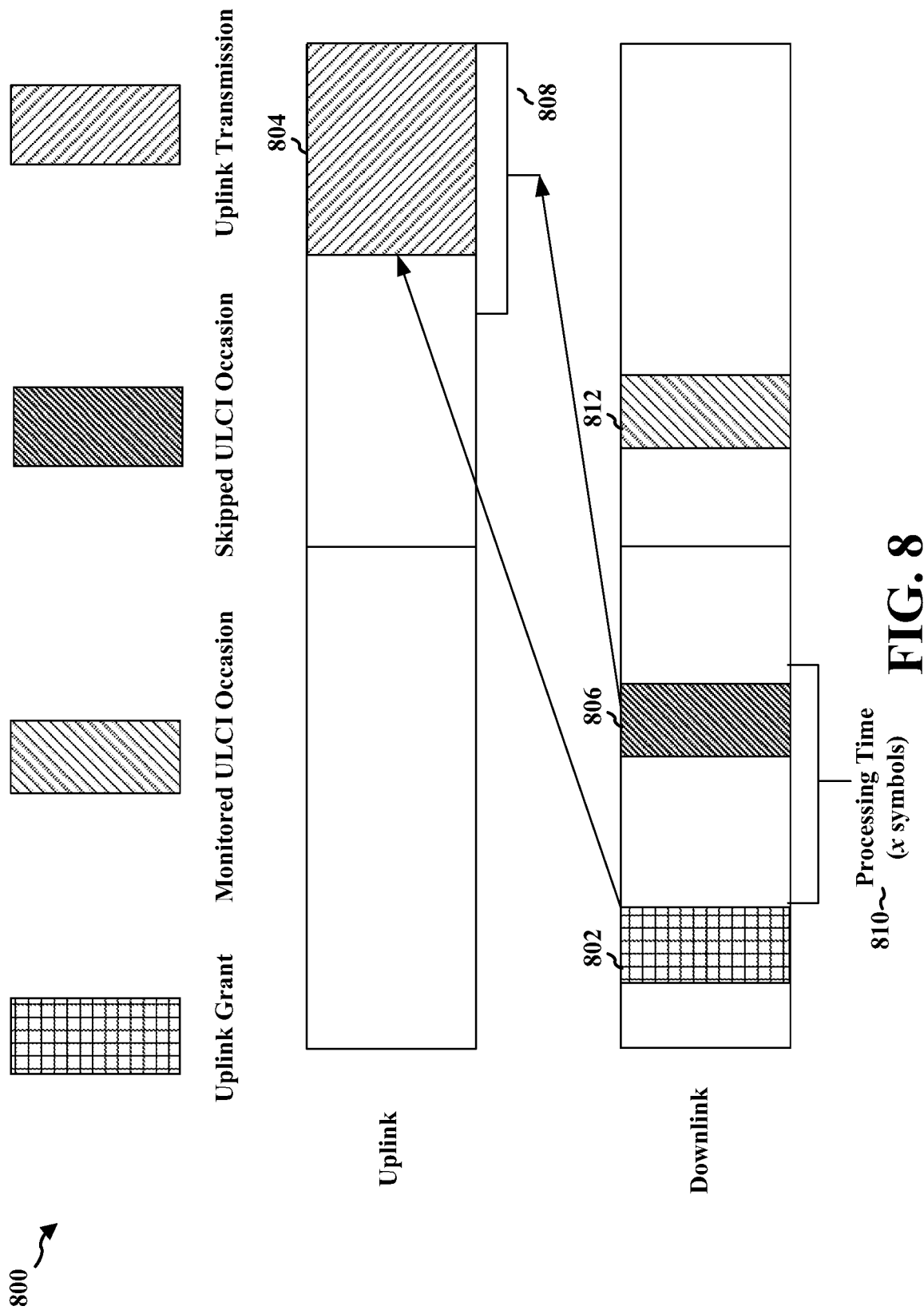
FIG. 8 is a transmission diagram illustrating an example of downlink and uplink communication to and from a UE.
Figure 9:
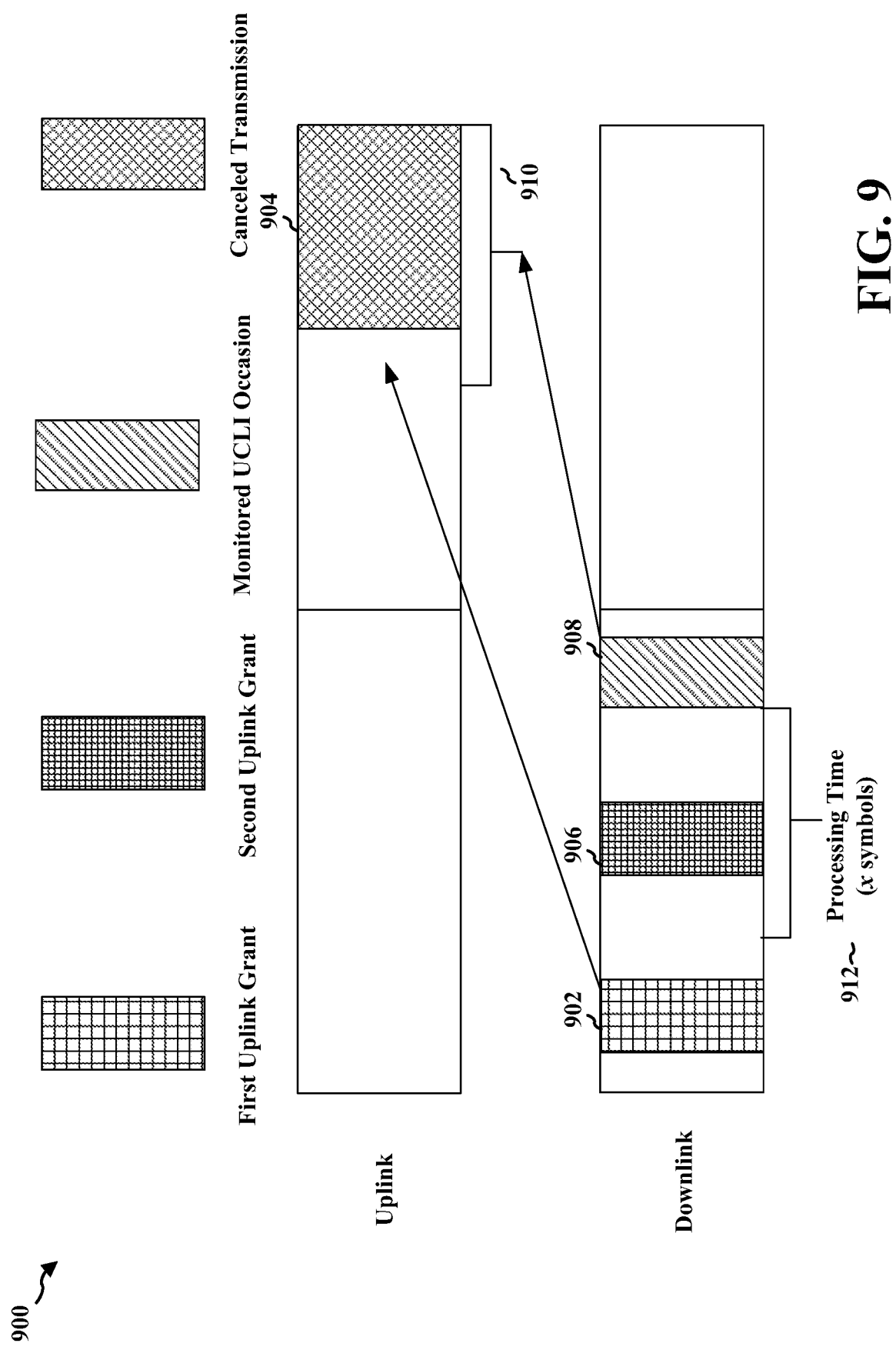
FIG. 9 is a transmission diagram illustrating an example of downlink and uplink communication to and from a UE.

Now referring to the second aspect and FIGS. 8 and 9, as described above, when the uplink transmission is dynamically scheduled by the base station (e.g. in an uplink grant), the UE may need processing time to receive and decode the uplink grant. For example, the UE may require a particular number of symbols, x, to decode an uplink grant after it is received, where x=1 or another number. Accordingly, if the ULCI is received before the uplink grant is decoded, the UE may not be able to monitor the ULCI occasion associated with the window for the uplink transmission scheduled by the uplink grant. Although the UE could buffer all received signals on the ULCI occasion, decode the dynamic scheduling information (e.g., the uplink grant), and then decode the ULCI if the UE detects that the scheduled uplink transmission overlaps with the time-domain resources indicated by the ULCI occasion, such buffering may increase the complexity of UE implementation and requires additional memory to buffer the signals. Therefore, to maintain simplicity of operation without the need for additional memory usage, the UE may monitor a ULCI occasion associated with a time-domain window of an uplink transmission if the UE receives the uplink grant scheduling that uplink transmission at least a certain number of symbols earlier than the ULCI occasion. For example, the UE may monitor a ULCI occasion if an uplink grant arrives at least x number of symbols earlier than the starting symbol of the control resource set (CORESET) of the ULCI occasion; otherwise, the UE may skip monitoring that ULCI occasion.

For example, FIG. 8 illustrates an example transmission diagram 800 in which a UE receives an uplink grant 802 dynamically scheduling an uplink transmission 804 (e.g. PUSCH, PUCCH, SRS, etc.). The ULCI occasion 806 may be associated with a certain set of time domain resources or window 808 in which the uplink transmission 804 is dynamically scheduled, for example. However, as shown in FIG. 8, the uplink grant 802 has been received by the UE less than a certain number of symbols x 810 before the starting symbol of the ULCI occasion 806. As a result, the UE may skip monitoring ULCI occasion 806 and proceed to transmit data in uplink transmission 804, thereby reducing the power consumption burden imposed on the UE from frequent monitoring of ULCI occasions. When the UE determines whether or not to monitor the ULCI occasion 806 (the determination being made before the first symbol of 806), the UE may not have decoded the uplink grant 802. In this example, the UE may determine that no uplink transmission has been scheduled, and thus, the UE may skip monitoring the ULCI occasion 806. In contrast, when the UE determines whether or not to monitor ULCI occasion 812, the UE may have already decoded uplink grant 802. Thus, if the ULCI 812 corresponds to at least one symbol in uplink resources 804, the UE may determine to monitor the ULCI occasion 812.

Similarly, the base station may refrain from transmitting ULCI in a ULCI occasion if the base station determines that the UE will not monitor the ULCI occasion, for example, if the base station does not transmit the uplink grant dynamically scheduling an uplink transmission at least a certain number of symbols earlier than the ULCI occasion associated with a time-domain window of the uplink transmission. A base station may first determine whether the base station will cancel a part of an uplink transmission in resources that are previously granted. Thus, the UE may determine whether the base station will cancel a part of uplink transmission 804 in order to reserve resources for an URLLC transmission. The base station may determine to transmit during a ULCI occasion when the base station will puncture a part of an uplink transmission. If no uplink resources need to be canceled, the base station may refrain from transmitting the ULCI. For example, as shown in FIG. 8, the base station may transmit the uplink grant 802 such that the UE receives the uplink grant 802 less than the certain number of symbols x 810 before the starting symbol of the ULCI occasion 806. In such case, the base station may determine the UE will skip monitoring ULCI occasion 806, and may therefore refrain from transmitting the ULCI for uplink transmission 804 in ULCI occasion 806. Instead, the base station may transmit the ULCI for uplink transmission 804 in the next ULCI occasion 812 that the UE may monitor, thereby preventing a waste of resources from sending unnecessary ULCI occasions, improving system performance, and preventing misalignment of transmission/reception of ULCI occasions.

The UE may monitor a ULCI occasion associated with an uplink transmission if the UE receives the uplink grant scheduling that uplink transmission at least a certain number of symbols earlier than the ULCI occasion, even if a subsequent uplink grant is received that is within a certain number of symbols before that ULCI occasion. For example, FIG. 9 illustrates an example transmission diagram 900 in which a UE receives a first uplink grant 902 dynamically scheduling a first uplink transmission 904 (e.g. PUSCH, PUCCH, SRS, etc.), and a second uplink grant 906 dynamically scheduling a second uplink transmission (not shown). A ULCI occasion 908 may also be associated with a certain set of time domain resources or window 910 in which the first uplink transmission 904 is dynamically scheduled. Unlike the example of FIG. 8, here the first uplink grant 902 has been received at least a certain number (x) of symbols 912 before the starting symbol of the ULCI occasion 908 associated with the first uplink transmission 904, notwithstanding the timing of the second uplink grant 906 being less than x symbols before ULCI occasion 908. Therefore, the UE determines to monitor the ULCI occasion 908, thereby reducing the power consumption burden imposed on the UE from frequent monitoring of ULCI occasions while simultaneously preventing misalignment of transmission/reception of ULCI occasions based on improper skipping of ULCI occasions based on timing of different grants.

Figure 11:
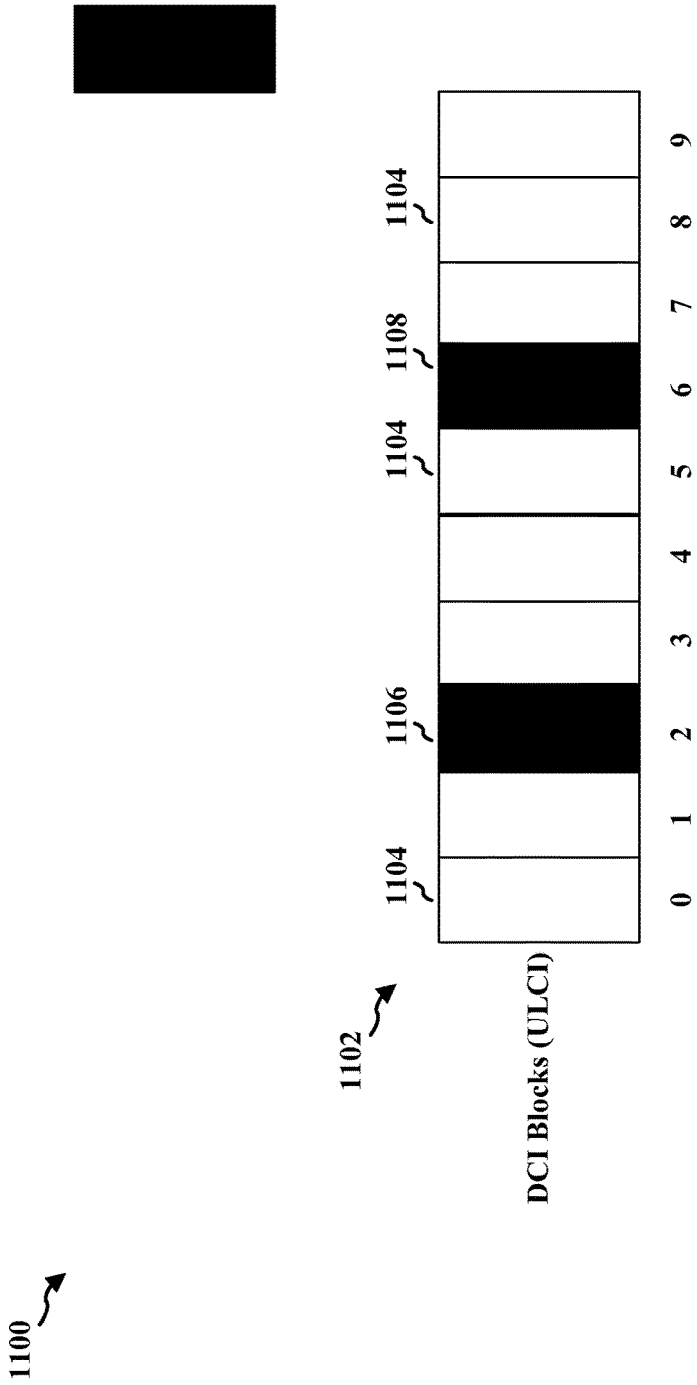
FIG. 11 is an example frame structure of a portion of downlink control information for ULCI.
Figure 12:
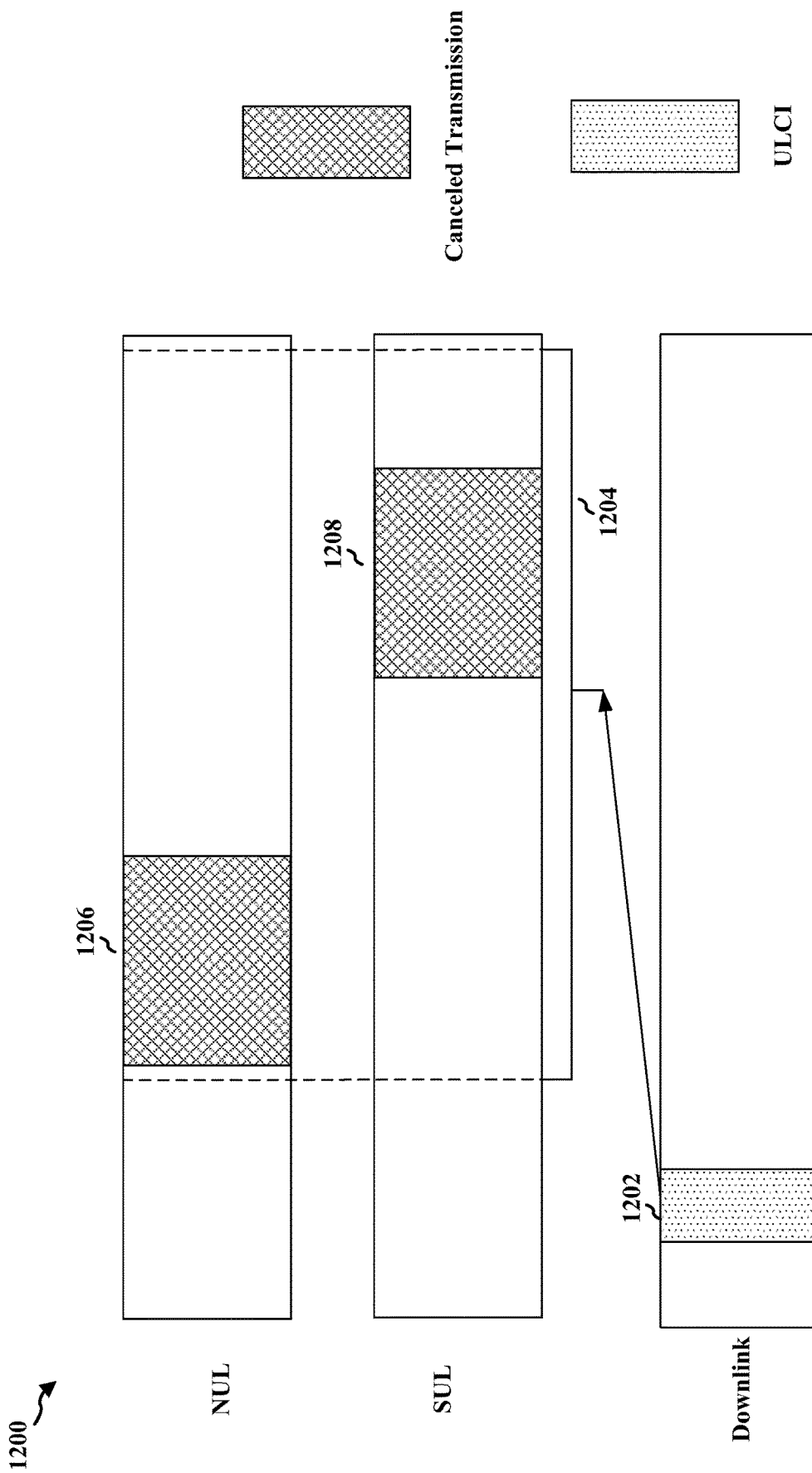
FIG. 12 is a transmission diagram illustrating an example of downlink and uplink communication to and from a UE.

Referring now to the third aspect and FIGS. 11 and 12, as the UE may be scheduled for uplink transmissions on either NUL or SUL carriers of a serving cell. Thus, it may be beneficial for the UE to be able to determine whether ULCI cancels transmissions carried on NUL and/or SUL. Aspects of the present disclosure allow the base station to configure the UE to monitor separate blocks or fields in ULCI, where each block corresponds to either the SUL carrier and/or NUL carrier of a given cell where the uplink transmission to be punctured is carried. ULCI may comprise multiple blocks. The UE may be configured in the DCI with the length of ULCI and may be configured to monitor a block corresponding to the SUL carrier, a block corresponding to the NUL carrier, or a block corresponding together to the SUL and NUL carriers. The UE may apply ULCI (e.g. cancel at least a portion of the uplink transmission according to various behaviors described with respect to FIG. 13 infra) on the corresponding carrier (e.g. SUL or NUL) indicated in each configured block.

In certain aspects, the base station may configure the same block for both the SUL carrier and the NUL carrier, in which case the UE may apply ULCI on both the SUL and NUL carriers of a given cell. In an example, the UE may autonomously apply ULCI on the corresponding carrier (e.g. SUL or NUL) based on the location of the uplink transmission indicated in the configured block (e.g., based on whether the uplink transmission is scheduled on the SUL or the NUL). In certain aspects where the uplink transmission is a PUSCH transmission, the UE may be configured with a single block corresponding to both NUL and SUL carriers since the UE cannot perform simultaneous PUSCH transmissions on the NUL and SUL carriers. This aspect may save base station signaling overhead compared to the third aspect, since the base station may configure the UE to apply ULCI to the SUL carrier and the NUL carrier using one block rather than two separate blocks.

Alternatively, the base station may configure the UE to monitor a block or field in the DCI comprising ULCI, where the block corresponds to either the SUL carrier or NUL carrier of a given cell where the uplink transmission to be punctured is carried. The UE may be configured in RRC with the length of ULCI and with either a block corresponding to the SUL carrier or a block corresponding to the NUL carrier. For example, as described in connection with the example of FIG. 11, the UE may receive a configuration (e.g., in an UplinkCancellation or another configuration parameter) that indicates the location corresponding to a particular cell. As illustrated in FIG. 11, there may be locations for more than one cell. Thus, the configuration may indicate a corresponding location for each of the cells, e.g., in a parameter such as ci-ConfigurationPerServingCell or another name along with a corresponding position in the DCI. As an example, the configuration may indicate a number of fields in the DCI, e.g., a length of DCI (e.g. by positionInDCI-forSUL or another name) for each serving cell for a SUL carrier, e.g., if the serving cell is configured with a SUL carrier.

In other aspects, the UE may apply ULCI to both NUL carrier and SUL carrier even though the configured block may only correspond to NUL carrier or SUL carrier.

Alternatively, the base station may send the UE an RRC parameter indicating for the UE to only apply ULCI to either SUL carrier or NUL carrier. For example, the UCLI may comprise a group-common signaling that is transmitted to a group of UEs. A given block of ULCI may be configured for multiple UEs, and may be used to puncture uplink transmissions from the multiple UEs on a same cell using a single ULCI signal. However, some of the multiple UEs might not be configured with both NUL and SUL carriers. For example, one UE may be configured with both NUL and SUL carriers in the cell, but a second UE may be configured only with the NUL carrier in the cell. Both of the two UEs may monitor the same block in the ULCI. The base station may configure the first UE to monitor the ULCI for the NUL carrier and not for the SUL carrier.

For example, FIG. 11 illustrates an example frame structure 1100 of DCI, comprising ULCI 1102. The ULCI comprises multiple blocks 1104 that may be configured for a particular cell. Each block 1104 may correspond to at least one bit associated with a time domain resource granularity (e.g. a number of symbols), where '0' may indicate not to cancel an uplink transmission and '1' may indicate to cancel an uplink transmission (e.g., apply the ULCI), or vice-versa. The blocks 1104 may be configured to indicate which carrier (SUL or NUL) and resources/symbols the portion of the uplink transmission are to be punctured or canceled. In one example as shown in FIG. 11, the base station may configure UE with at least one block of the ULCI. In FIG. 11, the UE may be configured to receive ULCI in block two 1106 and block six 1108 of the ULCI 1102 structure, where block two 1106 may be configured to correspond to NUL and block six 1108 may be configured to correspond to SUL (or vice-versa). FIG. 11 merely illustrates a single example; a UE may be configured to receive ULCI in any block of ULCI 1102 may be configured (e.g. with 0 or 1) and any of the blocks may be configured to correspond to a NUL carrier or a SUL carrier of a given cell. For example, the UE may apply ULCI to either the NUL carrier or SUL carrier based on which of blocks 1106, 1108 the ULCI instruction to cancel the transmission was received. In another example, the UE may apply ULCI received in a single block to both the NUL carrier and the SUL carrier.

Thus, when the UE receives instructions to cancel an uplink transmission in blocks 1106 and/or 1108, the UE may apply the ULCI to cancel at least a portion of the uplink transmission on the carrier(s) (SUL and/or NUL) and resources indicated in the blocks. If UE is configured to receive ULCI for the NUL carrier in block 1106 and for the SUL carrier in block 1108, the UE would cancel the transmission on the NUL carrier when the ULCI instructions are received in block 1106. The UE would cancel the transmission on the SUL carrier when the ULCI instructions are received in block 1108.

FIG. 12 illustrates an example transmission diagram 1200 in which the UE receives a ULCI 1202 (corresponding to ULCI 1102 of FIG. 11) associated with window 1204. Assuming block two 1106 is configured to correspond to NUL and block six 1108 is configured to correspond to SUL as described above, the UE may proceed to cancel at least a portion of a first uplink transmission 1206 at the carrier (i.e.

NUL) and time domain resources indicated in block 1106 of FIG. 11, and at least a portion of a second uplink transmission 1208 at the carrier (i.e. SUL) and time domain resources indicated in block six 1108 of FIG. 11, depending on the block 1106 or 1108 in which the instructions to cancel are received. Thus, based on the configuration of the blocks in DCI 1102/ULCI 1202, the UE may readily determine the carriers (NUL or SUL) and resources of the uplink transmission(s) to be canceled when receiving ULCI.

If a single block, e.g., 1106 were configured to apply to both NUL and SUL carriers, the UE in FIG. 12 may cancel the transmissions 1206 and 1208 when ULCI instructions are received in 1106. As well, the UE may be configured with a single block for both NUL and SUL carriers. The UE may autonomously apply the ULCI to the NUL/SUL carriers based on the location of any scheduled uplink transmissions on the NUL/SUL carriers.

After receiving ULCI in a selectively monitored ULCI occasion, the UE may perform one or more actions or behaviors on the NUL or SUL carrier of the cell when cancelling a portion of a previously scheduled uplink transmission in the window associated with the detected ULCI. For example, the UE may decide to stop transmitting the portion of the uplink transmission indicated by the ULCI without resuming subsequent uplink transmissions (i.e. "stopping the transmission without resuming"), the UE may decide to stop transmitting the portion of the uplink transmission indicated by the ULCI while resuming further uplink transmissions (i.e. "stopping the transmission with resuming"). Alternatively, the UE may decide to reduce transmission power for the portion of the uplink transmission indicated by the ULCI rather than stopping transmission of that portion. The UE may alternatively or additionally perform other actions on the SUL or NUL carrier.

Figure 13:
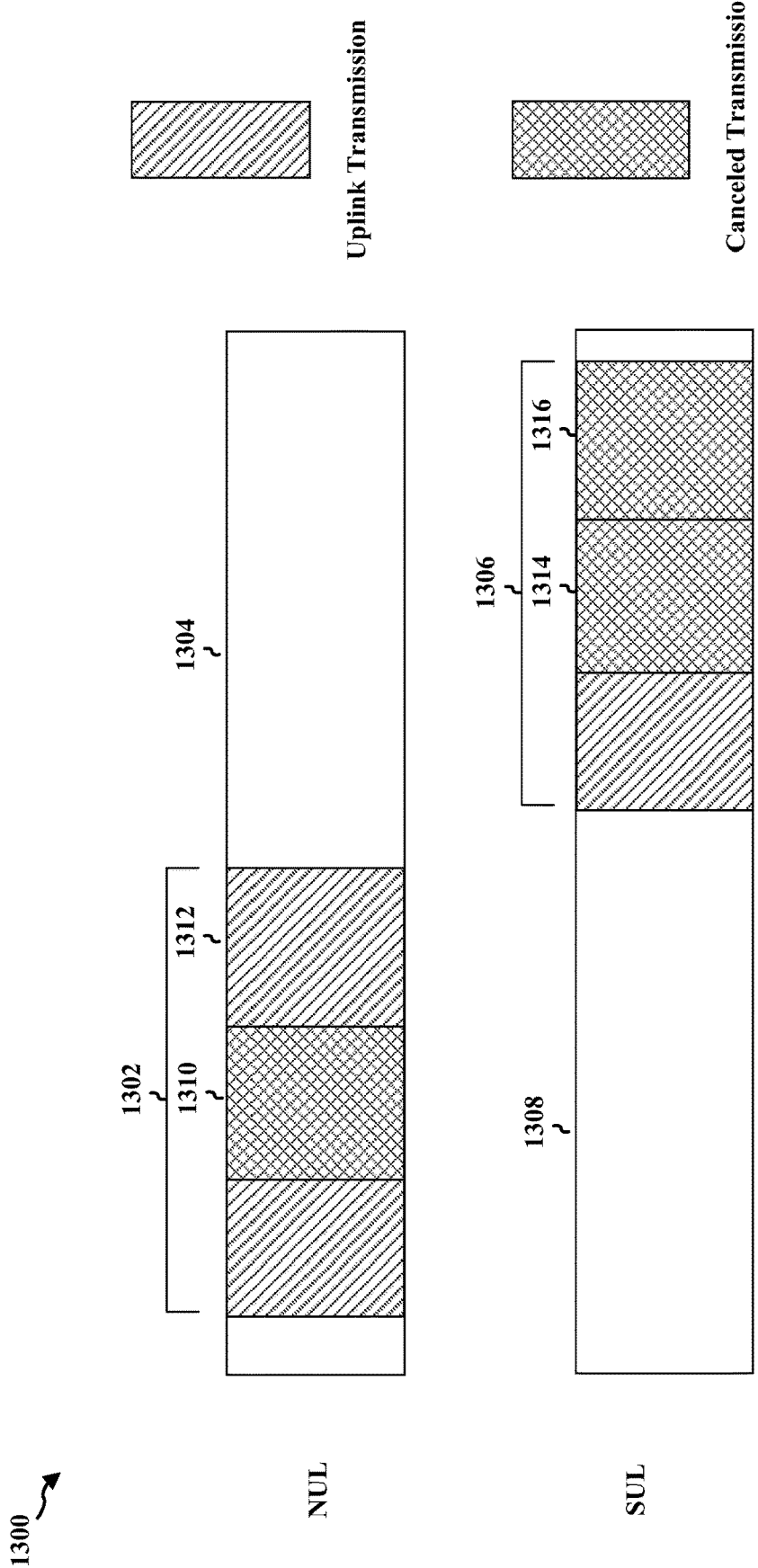
FIG. 13 is a transmission diagram illustrating an example of uplink communications from a UE.

In various aspects, the UE may report to the base station that it is capable of performing any one or more of the above-identified actions on either the SUL or NUL carrier, and the base station may configure the UE to perform one or more of these actions on either the NUL and/or SUL carrier. For example, FIG. 13 illustrates an example transmission diagram 1300 including a first uplink transmission 1302 carried on a NUL carrier 1304 and a second uplink transmission 1306 carried on a SUL carrier 1308. In this example, the base station has configured the UE to perform the "stopping transmission with resuming" action when applying ULCI to NUL carrier 1304, but has configured the UE to perform the "stopping transmission without resuming" action when applying ULCI to SUL carrier 1308. Thus, FIG. 13 illustrates the UE canceling a portion 1310 of uplink transmission 1302 on NUL 1304 in response to the ULCI, while resuming its uplink transmission beginning at portion 1312 on NUL carrier 1304. In contrast, FIG. 13 illustrates the UE canceling a portion 1314 of uplink transmission 1306 on SUL carrier 1308 in response to the ULCI, while cancelling its subsequent uplink transmissions beginning at portion 1316. The aforementioned illustration is merely one example; the UE may be configured to perform any action on the NUL or SUL carrier (e.g. stop without resuming on the NUL carrier but stop with resuming on the SUL carrier, stop without resuming on NUL but perform transmission power reduction on SUL, etc.). Thus, the UE may be configured to perform different actions with respect to its uplink transmissions on the NUL carrier than on the SUL carrier in response to receiving ULCI.

Figure 14:
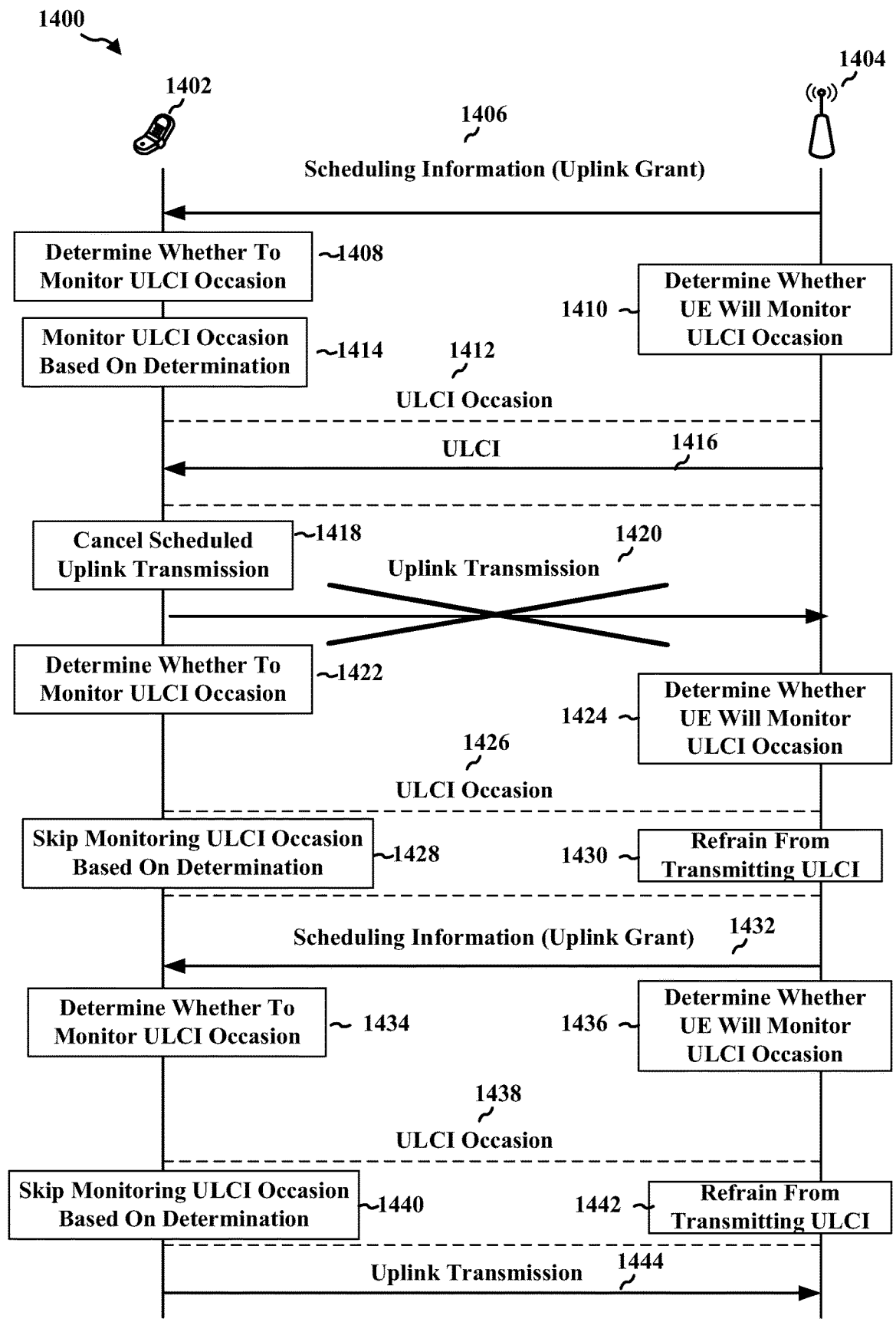
FIG. 14 is an example call flow diagram between a UE and a base station.

FIG. 14 illustrates an example call flow diagram 1400 between a UE 1402 and a base station 1404. Referring to FIG. 14, in one example, the base station 1404 schedules an uplink transmission (e.g. eMBB data) of the UE 1402 and sends scheduling information 1406 informing the UE of the uplink transmission. The UE 1402 then determines whether to monitor a ULCI occasion (1408) for the uplink transmission, and similarly the base station 1404 may determine whether the UE 1402 will monitor the ULCI occasion (1410). For example, the UE may determine to monitor the ULCI occasion if the base station has previously scheduled an uplink transmission for the UE that could potentially be punctured or canceled by an ULCI and having at least one symbol falling into a corresponding window for the ULCI occasion, as described above in the first aspect with reference to FIGS. 6 and 7.

At this time, the base station 1404 has previously scheduled an uplink transmission of the UE 1402 that could be potentially be canceled by ULCI (e.g. scheduling information 1406 for eMBB data) having at least one symbol falling within a corresponding window. For example, referring to FIG. 6, ULCI occasion 1412 may correspond with ULCI occasion 602, and the uplink transmission of FIG. 14 may correspond to uplink transmission 622 which includes at least one symbol within window 614 associated with ULCI occasion 602. Similarly, referring to FIG. 7, ULCI occasion 1412 may correspond with ULCI occasion 702 or 704, and the uplink transmission of FIG. 14 may correspond to uplink transmission 722 which includes at least one symbol within windows 714 and 716 associated with ULCI occasions 702 and 704. Therefore, the UE 1402 may determine to monitor the ULCI occasion 1412, and the base station 1404 may determine that the UE may monitor the ULCI occasion 1412. As a result, the UE may monitor the ULCI occasion (1414), the base station 1404 may transmit ULCI 1416 in ULCI occasion 1412, and the UE 1402 may receive the ULCI 1416. Based on the received ULCI 1416, the UE 1402 may cancel its scheduled uplink transmission (1418), as indicated by canceled uplink transmission 1420. As described above with reference to FIG. 6, the uplink transmission 1420 may be on the same serving cell as the associated ULCI occasion 1412, or on a different serving cell than the associated ULCI occasion 1412.

Subsequently, the UE 1402 determines whether to monitor another ULCI occasion (1422). Similarly, the base station 1404 determines whether the UE will monitor this ULCI occasion (1424). At this time, the base station 1404 has not scheduled a subsequent uplink transmission and the UE 1402 has not received scheduling information for such uplink transmission. For example, referring to FIG. 6, the next ULCI occasion 1426 may correspond with ULCI occasion 606 which is associated with window 616, in which there are no symbols of a scheduled uplink transmission for UE 1402. Similarly, referring to FIG. 7, the next ULCI occasion 1426 may correspond with ULCI occasion 708, in which there are no symbols of a scheduled uplink transmission for UE 1402. As a result, the UE 1402 may skip monitoring this ULCI occasion (1428), and the base station may likewise refrain from transmitting ULCI (1430) in ULCI occasion 1426. As described above with reference to FIG. 7, the window associated with ULCI occasion 1426 may overlap with other windows associated with other ULCI occasions, or different portions of the uplink transmission may include at least one symbol within different windows associated with ULCI occasions (including ULCI occasion 1426).

Next, the base station 1404 sends scheduling information 1432 for a new uplink transmission to UE 1402 which is limited from being punctured based on ULCI. For example, this uplink transmission may be URLLC data or other higher priority data that may not be cancellable by ULCI. Afterwards, the UE 1402 determines whether to monitor the next ULCI occasion (1434), and the base station 1404 may similarly determine whether the UE will monitor the next ULCI occasion (1436). In this case, the UE may determine (e.g. from scheduling information 1432) that the uplink transmission may not be punctured or cancellable by ULCI. For example, the uplink transmission may correspond to uplink transmission 624 in FIG. 6, and the next ULCI occasion 1438 may correspond to ULCI occasion 610 in which at least one symbol of uplink transmission 624 may fall. As a result, the UE 1402 may skip monitoring the next ULCI occasion (1440), and the base station may likewise refrain from transmitting ULCI (1442) in ULCI occasion 1438. The UE 1402 may subsequently transmit its uplink transmission 1444 to the base station 1404.

Figure 15:
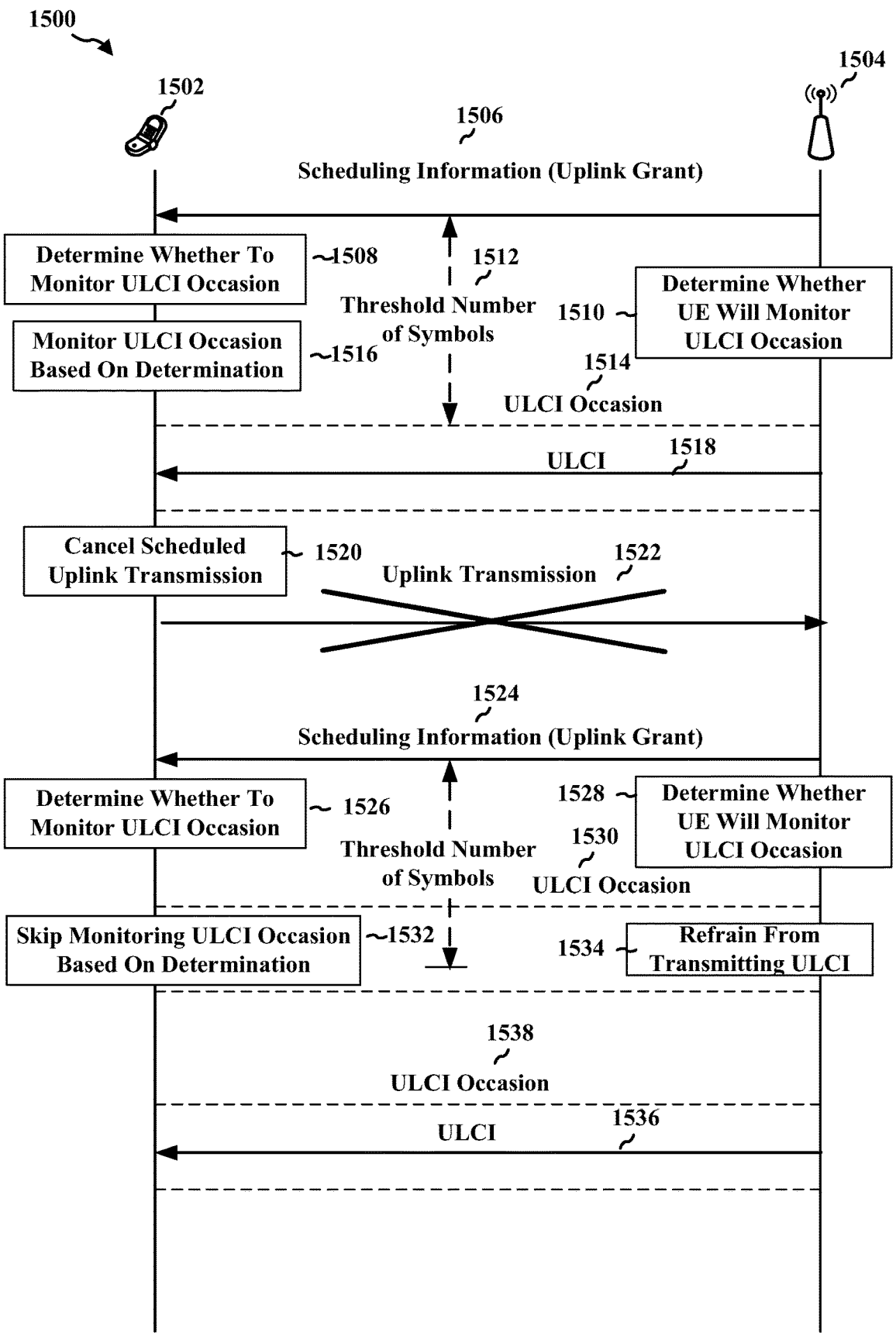
FIG. 15 is an example call flow diagram between a UE and a base station.

FIG. 15 illustrates another example call flow diagram 1500 between a UE 1502 and a base station 1504. Referring to FIG. 15, in one example, the base station 1504 may dynamically schedule an uplink transmission (e.g. eMBB data) of the UE 1502 and send scheduling information 1506 informing the UE of the uplink transmission. The UE 1502 then determines whether to monitor a ULCI occasion (1508) for the uplink transmission, and similarly the base station 1504 may determine whether the UE 1502 will monitor the ULCI occasion (1510). For example, the UE 1502 may determine to monitor the ULCI occasion if the UE receives the dynamically scheduled uplink grant at least a certain number of symbols earlier than the ULCI occasion associated with the uplink transmission, as described above in the second aspect with reference to FIGS. 8 and 9.

At this time, the base station 1504 has dynamically scheduled an uplink transmission of the UE 1502 that could be potentially be canceled by ULCI (e.g. scheduling information 1506 for eMBB data) having at least one symbol falling within a corresponding window (similar to FIG. 14). Moreover, the dynamically scheduled uplink grant 1506 has been received by UE 1502 at least a threshold number of symbols 1512 earlier than the starting symbol of the CORE-SET of ULCI occasion 1514, as illustrated in FIG. 15. Therefore, the UE 1502 determines to monitor the ULCI occasion 1514, and the base station 1504 may determine that the UE will monitor the ULCI occasion 1514. As a result, the UE monitors the ULCI occasion (1516), the base station 1504 transmits ULCI 1518 in ULCI occasion 1514, and the UE 1502 receives the ULCI 1518. Based on the received ULCI 1518, the UE 1502 may cancel its scheduled uplink transmission (1520), as indicated by canceled uplink transmission 1522.

Subsequently, the base station 1504 sends scheduling information 1524 for a new uplink transmission to UE 1502. Afterwards, the UE 1502 determines whether to monitor the next ULCI occasion (1526), and the base station 1504 may similarly determine whether the UE will monitor the next ULCI occasion (1528). In this case, the UE may determine that the dynamically scheduled uplink grant 1524 will be received by UE 1502 less than the threshold number of symbols 1512 earlier than the starting symbol of the CORE-SET of ULCI occasion 1530, as illustrated in FIG. 15. For example, the uplink grant 1524 may correspond to uplink grant 802 in FIG. 8, which is received by the UE less than the threshold number of symbols (e.g. x symbols 810). As a result, the UE 1502 may skip monitoring the next ULCI occasion (1532), and the base station may likewise refrain from transmitting ULCI (1534) in ULCI occasion 1530. Instead, the base station 1504 may transmit the ULCI 1536 for the uplink transmission in the next ULCI occasion 1538 which the UE may monitor, as illustrated in FIG. 15.

Figure 16:
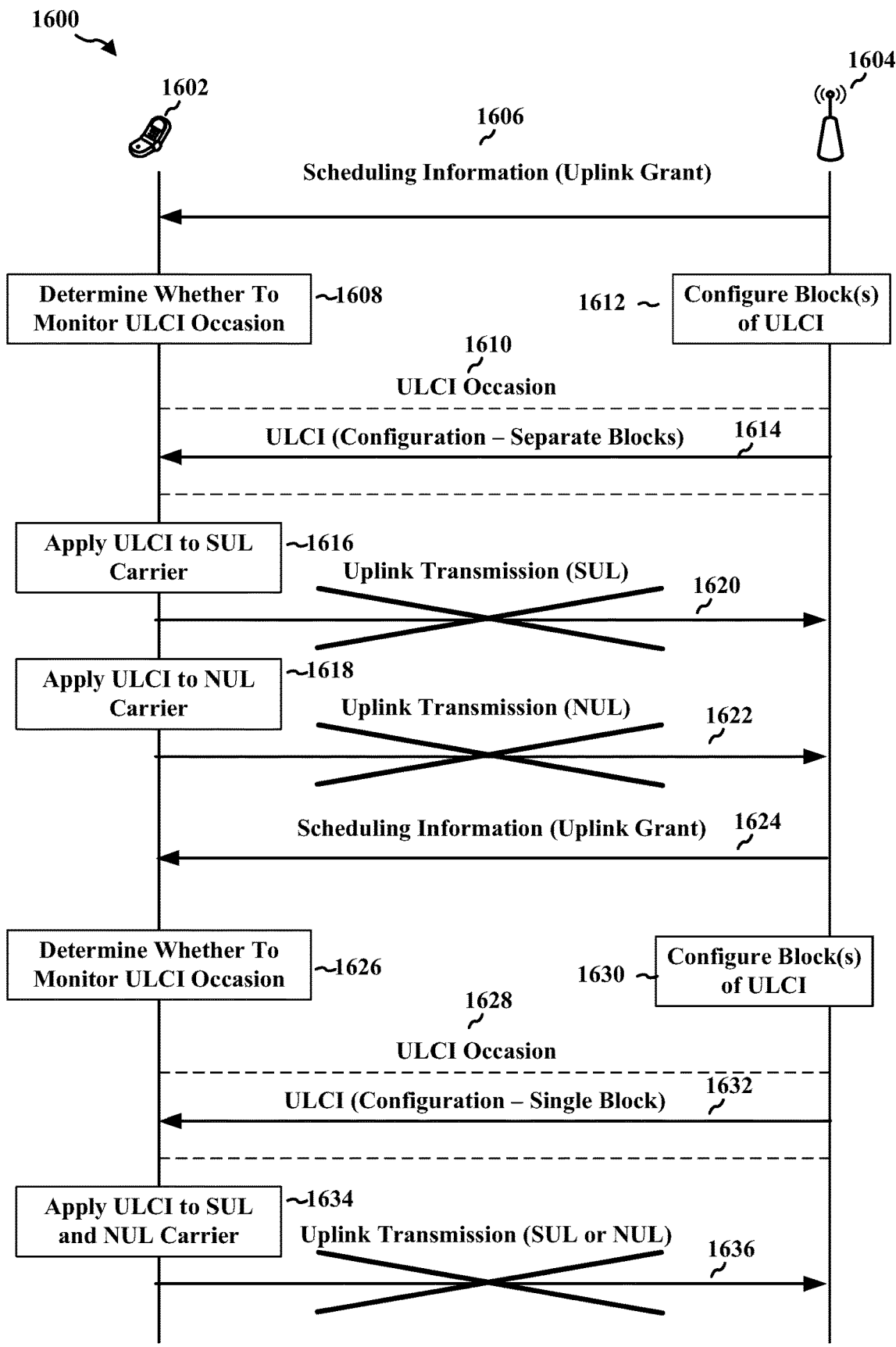
FIG. 16 is an example call flow diagram between a UE and a base station.

FIG. 16 illustrates another example call flow diagram 1600 between a UE 1602 and a base station 1604. Referring to FIG. 16, in one example, the base station 1604 dynamically schedules an uplink transmission (e.g. eMBB data) of the UE 1602 and sends scheduling information 1606 informing the UE of the uplink transmission. In this case, the uplink grant 1606 may schedule the UE's uplink transmission on either a NUL or SUL carrier of a cell. The UE 1602 then determines whether to monitor a ULCI occasion (1608) for the uplink transmission, and similarly the base station 1604 may determine whether the UE 1602 will monitor the next ULCI occasion 1610, as described above with respect to FIGS. 14 and 15. The base station may configure the UE to monitor at least one block of ULCI (1612), where each block corresponds to either the SUL carrier or to the NUL carrier, as described with respect to FIG. 11. For example, the base station 1604 may configure at least one block (e.g. block two 1106 and block six 1108 of FIG. 11 in DCI 1102) as corresponding to the carrier(s) on which the uplink transmission is scheduled (e.g. NUL or SUL carrier). Afterwards, the base station 1604 transmits ULCI 1614 including the configured block(s) in ULCI occasion 1610, and the UE 1602 receives the ULCI 1614 including the configured block(s).

Based on the received ULCI 1614, the UE 1602 applies the ULCI 1614 to the SUL carrier (1616) and/or to the NUL carrier (1618) to cancel at least a portion of its scheduled uplink transmission on the carrier(s) and resources indicated in the configured blocks. For example, the scheduled uplink transmission may correspond to either the first uplink transmission 1206 on NUL carrier or second uplink transmission 1208 on SUL carrier of FIG. 12, and the UE then cancels its scheduled uplink transmission on the carrier(s) applied. Thus, the UE may cancel its SUL uplink transmission 1620 and/or NUL uplink transmission 1622.

In another example, the base station 1604 may dynamically schedule another uplink transmission (e.g. eMBB data) of the UE 1602 and send scheduling information 1624 informing the UE of the uplink transmission. In this case, the uplink grant 1624 may also schedule the UE's uplink transmission on either NUL or SUL carrier of a cell. The UE 1602 then determines whether to monitor a ULCI occasion (1626) for the uplink transmission, and similarly the base station 1604 may determine whether the UE 1602 will monitor the next ULCI occasion 1628, as described above with respect to FIGS. 14 and 15. The base station may configure only one block of ULCI (1630) for the UE to monitor, where the block corresponds to both SUL and NUL carrier, as described with respect to FIG. 11. For example, the base station 1604 may configure one block (e.g. block two 1106 or block six 1108 of FIG. 11 in DCI 1102), and the UE may apply the ULCI to a corresponding carrier on which the uplink transmission is scheduled (e.g. NUL or SUL carrier). The base station 1604 may transmit ULCI 1632 including the configured block in ULCI occasion 1628, and the UE 1602 may receive the ULCI 1632 including the configured block.

Based on the received ULCI 1632, the UE 1602 may apply the ULCI 1632 to the SUL carrier and the NUL carrier (1634) to cancel at least a portion of its scheduled uplink transmission on the carrier and resources indicated in the configured block. For example, the scheduled uplink transmission may correspond to either the first uplink transmission 1206 on NUL carrier or second uplink transmission 1208 on SUL carrier of FIG. 12, and the UE then cancels its scheduled uplink transmission on the carriers applied. Thus, the UE may cancel its SUL uplink transmission or NUL uplink transmission 1636.

Figure 17:
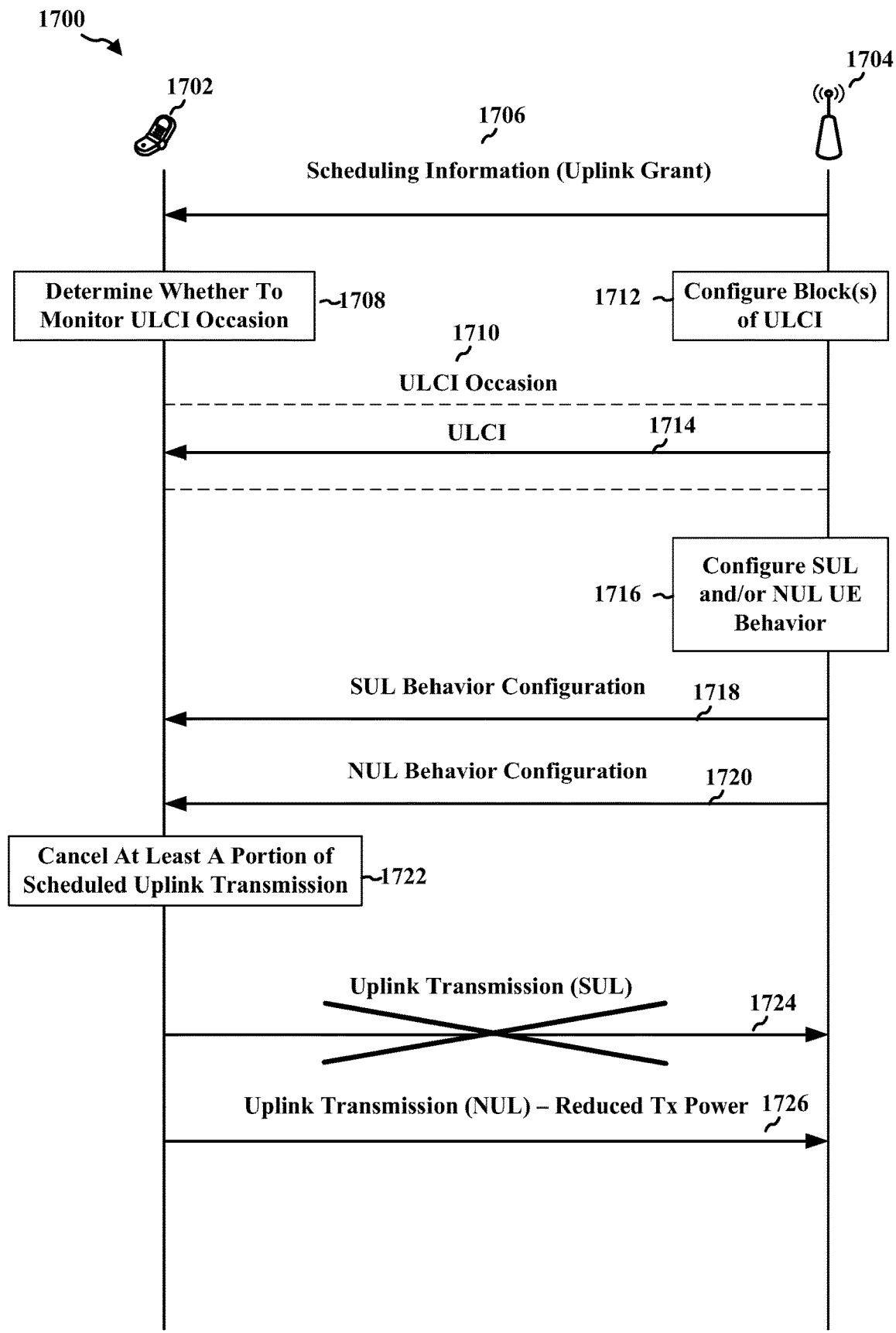
FIG. 17 is an example call flow diagram between a UE and a base station.

FIG. 17 illustrates another example call flow diagram 1700 between a UE 1702 and a base station 1704. Referring to FIG. 17, in one example, the base station 1704 schedules an uplink transmission (e.g. eMBB data) of the UE 1702 and sends scheduling information 1706 informing the UE of the uplink transmission. The uplink grant 1706 may schedule the UE's uplink transmission on either the NUL carrier or the SUL carrier of a cell. The UE 1702 then determines whether to monitor a ULCI occasion (1708) for the uplink transmission, and similarly the base station 1704 may determine whether the UE 1702 will monitor the next ULCI occasion 1710, as described above with respect to FIGS. 14 and 15. The base station may configure one or two blocks of ULCI (1712) for the UE to monitor, where each block corresponds to either SUL or NUL carrier, as described in connection with FIG. 16. Afterwards, the base station 1704 may transmit ULCI 1714 including the configured block(s) in ULCI occasion 1710, and the UE 1702 receives the ULCI 1714 including the configured block(s).

Based on the received ULCI 1714, the UE 1702 may cancel at least a portion of its scheduled uplink transmission on the SUL or NUL carriers based one or more actions or behaviors, as described above with respect to FIG. 13. The base station 1704 may configure the UE to perform one or more of these behaviors on the SUL and/or NUL carrier (1716), and may send these configuration(s) to the UE 1702. For example, the base station 1704 may send a SUL behavior configuration 1718 and a NUL behavior configuration 1720 to UE 1702 indicating that the UE may perform one or more of the following actions when cancelling its uplink transmission on the SUL or NUL, respectively: stopping the transmission without resuming, stopping the transmission with resuming, or reducing transmission power. The SUL behavior configuration 1718 and/or NUL behavior configuration 1720 may be included in the uplink grant 1706, the ULCI 1714, or in separate message(s) as illustrated in FIG. 17. The behavior configured for the SUL carrier may be different than for the NUL carrier.

The UE 1702 may then cancel at least a portion of its scheduled uplink transmission(s) (1722) according to the received configurations. For example, the SUL behavior configuration 1718 may configure the UE to stop its SUL uplink transmission 1724 without resuming, while the NUL behavior configuration 1720 may configure the UE to reduce its transmission power in lieu of stopping its NUL uplink transmission 1726. The base station 1704 may configure the UE 1702 to perform any action such as those above-described on the NUL or SUL carrier when cancelling at least a portion of its uplink transmission(s).

Figure 18:
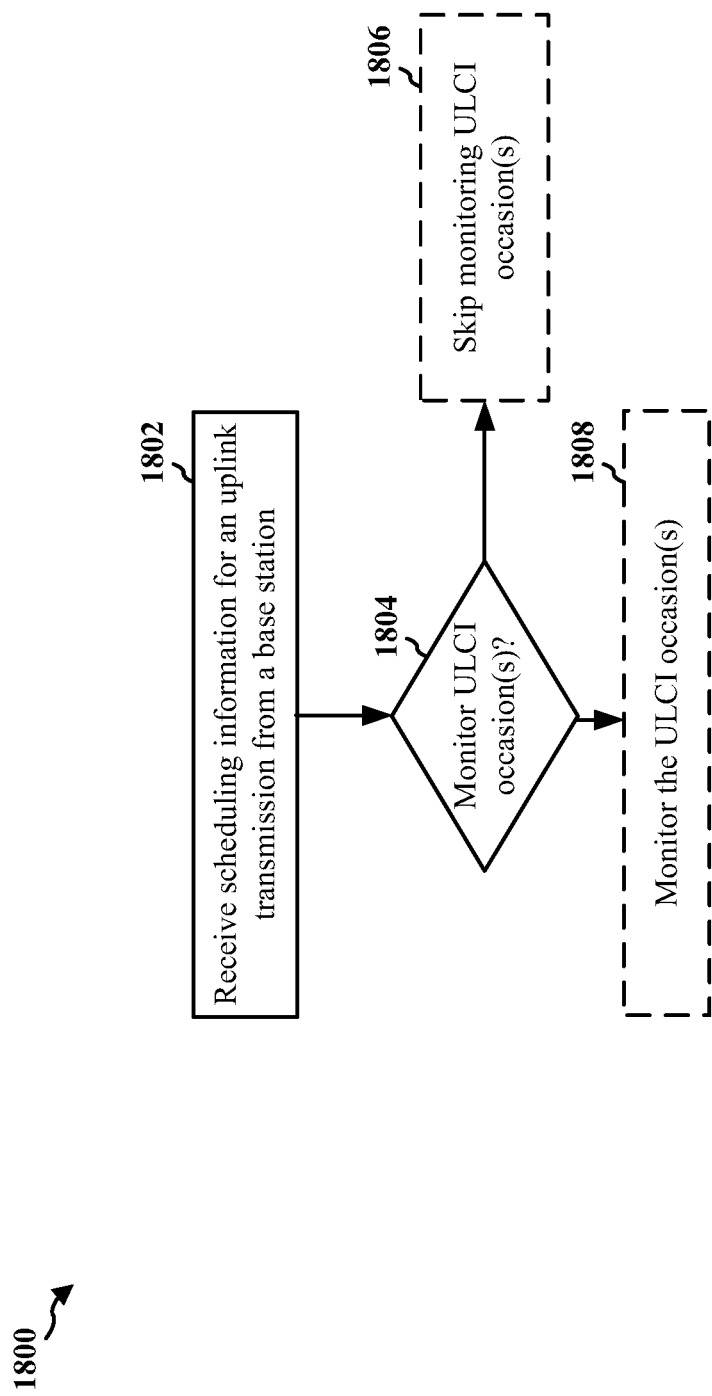
FIG. 18 is a flowchart of a method of wireless communication.

FIG. 18 is a flowchart 1800 of a method of wireless communication. The method may be performed by a UE (e.g., the UE 104, 350, 1402, 1502, 1602, 1702; the apparatus 2002/2002'; the processing system 2114, which may include the memory 360 and which may be the entire UE 350 or a component of the UE 350, such as the TX processor 368, the RX processor 356, and/or the controller/processor 359). Optional aspects are illustrated in dashed lines. The method allows a UE to selectively monitor ULCI occasions and corresponding transmission of ULCI occasions by a base station (e.g., the base station 102/180, 310, 1404, 1504, 1604, 1704), as well as to determine from ULCI whether the uplink transmission to be canceled is carried on the NUL carrier or the SUL carrier of a cell.

At 1802, the UE receives scheduling information for an uplink transmission from a base station. The uplink transmission may comprise PUCCH, PUSCH, SRS, etc. For example, 1802 may be performed by reception component 2004. For instance, referring to FIG. 14, the base station 1404 schedules an uplink transmission (e.g. eMBB data) of the UE 1402 and sends scheduling information 1406 informing the UE of the uplink transmission. The UE receives the scheduling information from the base station. Similar operations are performed in FIGS. 15, 16, and 17.

At 1804, the UE determines whether to monitor at least one ULCI occasion from the base station based on the scheduling information. For example, 1804 may be performed by determination component 2006. For instance, referring to FIG. 14, The UE 1402 determines whether to monitor a ULCI occasion (1408) for the uplink transmission. For example, the UE may determine to monitor the ULCI occasion if the base station has previously scheduled an uplink transmission for the UE that could potentially be punctured or canceled by an ULCI and having at least one symbol falling into a corresponding window for the ULCI occasion, as described above in the first aspect with reference to FIGS. 6 and 7. Similarly, at FIG. 15, the UE 1502 determines whether to monitor a ULCI occasion (1508) for the uplink transmission. For example, the UE 1502 may determine to monitor the ULCI occasion if the UE receives the dynamically scheduled uplink grant at least a certain number of symbols earlier than the ULCI occasion associated with the uplink transmission, as described above in the second aspect with reference to FIGS. 8 and 9.

In one aspect, the UE may determine to skip monitoring the at least one ULCI occasion when the UE has not been scheduled for a corresponding uplink transmission. The UE may determine to skip monitoring for the ULCI occasion when the UE is not scheduled for the uplink transmission in any symbol of the corresponding set of time-domain resources associated with the ULCI occasion. For example, referring to FIG. 14, at the time UE 1402 determines whether to monitor another ULCI occasion (1422), the base station 1404 has not scheduled a subsequent uplink transmission and the UE 1402 has not received scheduling information for such uplink transmission. As a result, the UE 1402 will skip monitoring this ULCI occasion (1428), e.g., at 1806.

In another aspect, the may UE determine to monitor the at least one ULCI occasion when the scheduling information schedules the UE for the uplink transmission. Each ULCI occasion may be associated with a corresponding set of time-domain resources for the uplink transmission, and the UE determines to monitor an ULCI occasion when the UE is scheduled for the uplink transmission in at least one symbol of the corresponding set of time-domain resources associated with the ULCI occasion. The UE may determine the corresponding set of time domain resources associated with the ULCI occasion as a union of multiple configured time domain resources associated with the ULCI occasion. For example, referring to FIG. 14, at the time the UE 1402 determines whether to monitor a ULCI occasion (1408) for the uplink transmission, the base station 1404 has previously scheduled the uplink transmission of the UE 1402 that could be potentially be canceled by ULCI (e.g. scheduling information 1406 for eMBB data) having at least one symbol falling within a corresponding window. Therefore, the UE 1402 will determine to monitor the ULCI occasion 1412. As a result, the UE will monitor the ULCI occasion (1414) and the UE 1402 will receive the ULCI 1416.

The UE may also determine to skip monitoring for the ULCI occasion when the UE is scheduled for the uplink transmission, and where the uplink transmission is limited from being punctured based on a ULCI. For example, referring to FIG. 14, at the time the UE 1402 determines whether to monitor the next ULCI occasion (1434), the base station 1404 previously sent scheduling information 1432 for a new uplink transmission to UE 1402 which is limited from being punctured based on ULCI. In this case, the UE may determine (e.g. from scheduling information 1432) that the uplink transmission may not be punctured or cancellable by ULCI. As a result, the UE 1402 will skip monitoring the next ULCI occasion (1440).

In certain aspects, the uplink transmission may be scheduled on a same cell as the ULCI occasion. In other aspects, the uplink transmission may be scheduled on a different cell than the ULCI occasion. For example, referring to FIG. 14, after the UE monitors the ULCI occasion (1414) and receives the ULCI 1416, the UE 1402 will cancel its scheduled uplink transmission (1418), as indicated by canceled uplink transmission 1420. As described above with reference to FIG. 6, the uplink transmission 1420 may be on the same serving cell as the associated ULCI occasion 1412, or on a different serving cell than the associated ULCI occasion 1412.

In additional aspects, the corresponding sets of time-domain resources may overlap in time. For example, referring to FIG. 14, at the time UE 1402 determines whether to monitor another ULCI occasion (1422), the UE 1402 will skip monitoring ULCI occasion 1426 (1428). As described above with reference to FIG. 7, the window associated with ULCI occasion 1426 may overlap with other windows (e.g. forming overlapping sections 726 and 728) associated with other ULCI occasions.

If the uplink transmission is canceled in an ULCI in a first ULCI occasion associated with the sets of time-domain resources that overlap in time, the UE determines not to monitor a second ULCI occasion associated with the sets of time-domain resources that overlap in time, e.g., as described in connection with FIG. 7.

In further aspects, more than one ULCI occasion may be associated with different portions of the same uplink transmission. For example, referring to FIG. 14, at the time UE 1402 determines whether to monitor another ULCI occasion (1422), the UE 1402 will skip monitoring ULCI occasion 1426 (1428). As described above with reference to FIG. 7, different portions of the uplink transmission (e.g. uplink transmission portions 730 and 732) may include at least one symbol within different windows associated with ULCI occasions (including ULCI occasion 1426). If a first portion of the uplink transmission is canceled by a first ULCI in a first ULCI occasion and the UE cancels a second portion of the uplink transmission that corresponds to a second ULCI occasion, the UE determines not to monitor the second ULCI occasion.

In a further aspect, the UE may determine whether to monitor the at least one ULCI occasion further based on a separation in time between the scheduling information and the ULCI occasion, for example, when the uplink transmission for the UE is dynamically scheduled. The UE may determine to monitor the at least one ULCI occasion when the scheduling information is received a threshold number of symbols before the at least one ULCI occasion. For instance, the threshold number of symbols may be 1. For example, referring to FIG. 15, at the time the UE 1502 determines whether to monitor a ULCI occasion (1508) for the uplink transmission, the base station 1504 has dynamically scheduled an uplink transmission of the UE 1502, the grant of which has been received by UE 1502 at least a threshold number of symbols 1512 (e.g. x symbols, where x=1 or another number) earlier than the starting symbol of the CORESET of ULCI occasion 1514. Therefore, the UE 1502 will determine to monitor the ULCI occasion 1514.

Finally, at 1808, the UE may monitor the at least one ULCI occasion based on the determination at 1804. For example, 1808 may be performed by monitor component 2008. For example, referring to FIG. 14, at the time the UE 1402 determines whether to monitor a ULCI occasion (1408) for the uplink transmission, the base station 1404 has previously scheduled the uplink transmission of the UE 1402 that could be potentially be canceled by ULCI (e.g. scheduling information 1406 for eMBB data) having at least one symbol falling within a corresponding window. Therefore, the UE 1402 may monitor the ULCI occasion (1414). Similarly, referring to FIG. 15, at the time the UE 1502 determines whether to monitor a ULCI occasion (1508) for the uplink transmission, the base station 1504 has dynamically scheduled an uplink transmission of the UE 1502, the grant of which has been received by UE 1502 at least a threshold number of symbols 1512 earlier than the starting symbol of the CORESET of ULCI occasion 1514. As a result, the UE may monitor the ULCI occasion (1516).

Figure 19:
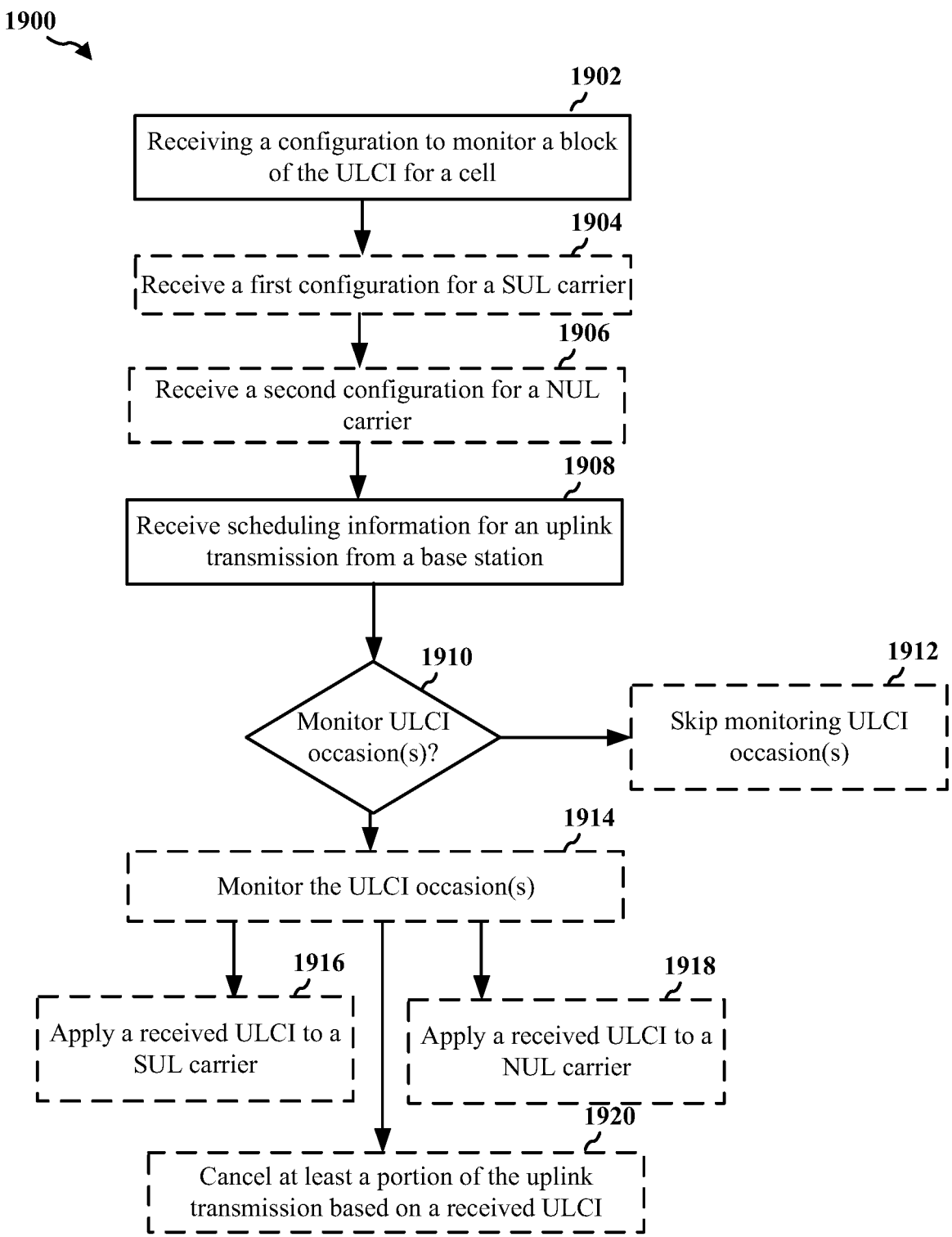
FIG. 19 is a flowchart of a method of wireless communication.

FIG. 19 is a flowchart 1900 of a method of wireless communication. The method may be performed by a UE (e.g., the UE 104, 350, 1402, 1502, 1602, 1702; the apparatus 2002/2002'; the processing system 2114, which may include the memory 360 and which may be the entire UE 350 or a component of the UE 350, such as the TX processor 368, the RX processor 356, and/or the controller/processor 359). Optional aspects are illustrated in dashed lines. The method allows a UE to determine from ULCI whether the uplink transmission to be canceled is carried on the NUL carrier or the SUL carrier of a cell, as well as selectively monitor ULCI occasions and corresponding transmission of ULCI occasions by a base station (e.g., the base station 102/180, 310, 1404, 1504, 1604, 1704).

At 1908, the UE receives scheduling information for an uplink transmission from a base station. The uplink transmission may comprise PUCCH, PUSCH, SRS, etc. For example, 1908 may be performed by reception component 2004. 1908 may correspond to 1802 of FIG. 18, which is described above.

At 1910, the UE determines whether to monitor at least one ULCI occasion from the base station based on the scheduling information. For example, 1910 may be performed by determination component 2006. 1904 may correspond to 1804 of FIG. 18, which is described above.

At 1914, the UE may monitor the at least one ULCI occasion based on the determination at 1910. For example, 1914 may be performed by monitor component 2008. Alternatively, at 1912, the UE may determine to skip monitoring the at least one ULCI occasion when the UE has not been scheduled for a corresponding uplink transmission. 1912 and 1914 may respectively correspond to 1806 and 1808, which are described above.

At 1902, the UE may receive a configuration to monitor at least one block of the ULCI based on the scheduling information, the ULCI comprising multiple blocks, where the configuration indicates at least one of a first block corresponding to a SUL carrier in a cell or a second block corresponding to a NUL carrier in the cell.

For example, reception of the configuration at 1902 may be performed by configuration component 2012. For example, referring to FIG. 16, the base station configures separate blocks of ULCI (1612) for the UE to monitor, where each block corresponds to either SUL or NUL carrier, as described above in the third aspect with respect to FIG. 11. For example, the base station 1604 may configure one or two blocks (e.g. block two 1106 and block six 1108 of FIG. 11 in DCI 1102) as corresponding to the carrier(s) on which the uplink transmission is scheduled (e.g. NUL or SUL carrier). Afterwards, the base station 1604 transmits ULCI 1614 including the configured block(s) in ULCI occasion 1610, and the UE 1602 receives the ULCI 1614 including the configured block(s).

In one aspect, the first block corresponding to the SUL carrier may be separate from the second block corresponding to the NUL carrier. In this aspect, the UE may apply a received ULCI to the SUL carrier, at 1916, to cancel the uplink transmission scheduled at the SUL carrier when a received ULCI comprises an indication in the first block. Alternatively or additionally, at 1918, the UE applies the received ULCI to the NUL carrier to cancel the uplink transmission scheduled at the NUL carrier when the received ULCI comprises an indication in the second block. For example, 1916 and 1918 may be performed by application component 2014. For instance, referring to FIG. 16, after the UE 1602 receives the ULCI 1614 including the configured block(s), the UE 1602 applies the ULCI 1614 to the SUL carrier (1616) and/or to the NUL carrier (1618) to cancel at least a portion of its scheduled uplink transmission on the carrier(s) and resources indicated in the configured blocks. For example, the scheduled uplink transmission may correspond to either the first uplink transmission 1206 on the NUL carrier or second uplink transmission 1208 on the SUL carrier of FIG. 12, and the UE then cancels its scheduled uplink transmission on the carrier(s) applied. Thus, the UE may cancel its SUL uplink transmission 1620 and/or NUL uplink transmission 1622.

In another aspect, the first block corresponding to the SUL carrier may be the same as the second block corresponding to the NUL carrier, e.g., the UE may be configured, at 1902, to monitor a single block. In this aspect, the UE may apply a received ULCI to the SUL carrier, at 1916, and the NUL carrier, at 1918, to cancel the uplink transmission scheduled at the SUL carrier and the NUL carrier. For example, 1916, 1918 may be performed by application component 2014. For instance, referring to FIG. 16, after the UE 1602 receives the ULCI 1614 including the configured block(s), the UE 1602 applies the ULCI 1614 to the SUL carrier (1616) and to the NUL carrier (1618) to cancel at least a portion of its scheduled uplink transmission on the carrier(s) and resources indicated in the configured blocks. In certain aspects, the base station may configure the same block for both SUL or NUL carrier, in which case the UE may apply ULCI on both the SUL and NUL carriers. Thus, the UE may cancel its SUL uplink transmission 1620 and NUL uplink transmission 1622.

The UE may receive a configuration, at 1902, to monitor a block of the ULCI for a cell, the ULCI comprising multiple blocks, where the block is associated with a SUL carrier in the cell or a NUL carrier in the cell. The configuration may indicate whether the ULCI is associated with the SUL carrier or the NUL carrier. For example, 1902 may be performed by configuration component 2012. For instance, referring to FIG. 16, the base station configures only one block of ULCI (1630) for the UE to monitor, where the block corresponds to either SUL or NUL carrier, as described above in the fourth aspect with respect to FIG. 11. For example, the base station 1604 may configure one block (e.g. block two 1106 or block six 1108 of FIG. 11 in DCI 1102) as corresponding to the carrier on which the uplink transmission is scheduled (e.g. NUL or SUL carrier). Afterwards, the base station 1604 transmits ULCI 1632 including the configured block in ULCI occasion 1628, and the UE 1602 receives the ULCI 1632 including the configured block.

At 1916 and 1918, the UE may apply a received ULCI to the SUL carrier and to the NUL carrier, where the UE punctures or cancels the uplink transmission scheduled at resources indicated in the ULCI. For example, 1916 and 1918 may be performed by application component 2014. For instance, referring to FIG. 16, after the UE receives ULCI 1632 including the configured block, the UE 1602 applies the ULCI 1632 to the SUL carrier and the NUL carrier (1634) to cancel at least a portion of its scheduled uplink transmission on the carrier and resources indicated in the configured block. For example, the scheduled uplink transmission may correspond to either the first uplink transmission 1206 on the NUL carrier or second uplink transmission 1208 on the SUL carrier of FIG. 12, and the UE then cancels its scheduled uplink transmission on the carriers applied. Thus, the UE may cancel its SUL uplink transmission or NUL uplink transmission 1636.

At 1920, the UE may cancel at least a portion of the uplink transmission based on a received ULCI. For example, 1920 may be performed by cancellation component 2016. For instance, referring to FIG. 17, after the UE 1702 receives the ULCI 1714 based on a determination to monitor a ULCI occasion (1708) and which includes configured blocks to be monitored by the UE, the UE 1702 may cancel at least a portion of its scheduled uplink transmission on the SUL or NUL carriers based one or more actions or behaviors, as described above with respect to FIG. 13.

At 1904, the UE may receive a first configuration for a SUL carrier to perform at least one of stopping the uplink transmission without resuming, stopping the uplink transmission with resuming, or reducing transmission power in response to a received ULCI. Similarly, at 1906, the UE may receive a second configuration for a NUL carrier to perform at least one of stopping the uplink transmission without resuming, stopping the uplink transmission with resuming, or reducing the transmission power in response to the received ULCI. The first configuration for the SUL may be different than the second configuration for the NUL carrier. For example, the reception of the configurations at 1904 and 1906 may be performed by configuration component 2012. For instance, referring to FIG. 17, the UE 1702 may receive a SUL behavior configuration 1718 and a NUL behavior configuration 1720 indicating that the UE may perform one or more of the following actions when cancelling its uplink transmission on the SUL or NUL carrier, respectively: stopping the transmission without resuming, stopping the transmission with resuming, or reducing transmission power. The UE 1702 may then cancel at least a portion of its scheduled uplink transmission(s) (1722) according to the received configurations.

Figure 20:
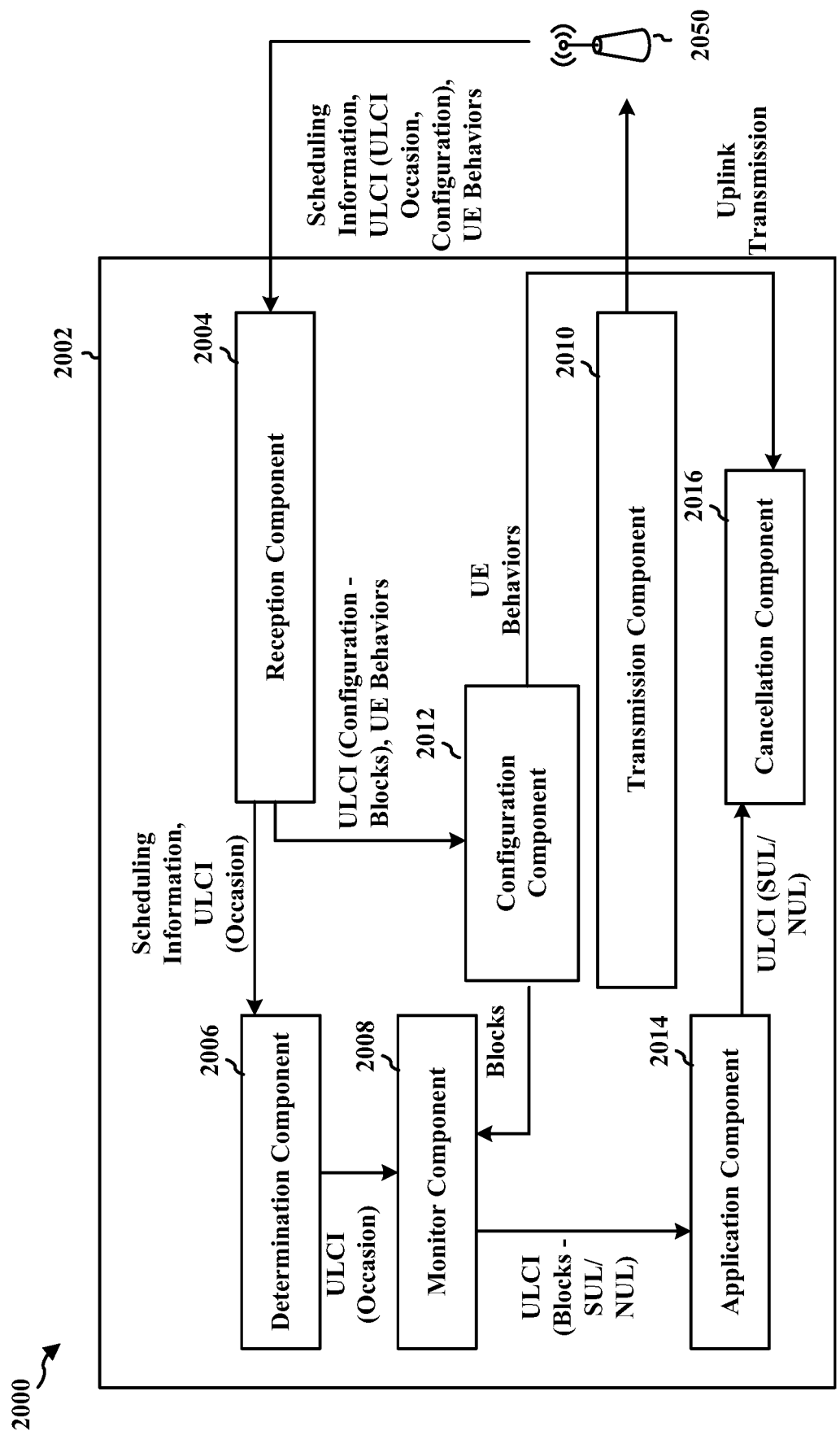
FIG. 20 is a conceptual data flow diagram illustrating the data flow between different means/components in an example apparatus.

FIG. 20 is a conceptual data flow diagram 2000 illustrating the data flow between different means/components in an example apparatus 2002. The apparatus may be a UE (e.g. UE 104, 350, 1402, 1502, 1602, 1702). The apparatus includes a reception component 2004 that receives scheduling information for an uplink transmission from a base station 2050 (e.g. base station 102/180, 310, 1404, 1504, 1604, 1704), e.g., as described in connection with 1802 and 1908. The apparatus includes a determination component 2006 that determines whether to monitor at least one ULCI occasion from the base station based on the scheduling information, e.g., as described in connection with 1804 and 1910. The apparatus may include a monitor component 2008 that monitors the at least one ULCI occasion based on a determination that the at least one ULCI occasion is valid, e.g., as described in connection with 1808 and 1914. The apparatus includes a transmission component 2010 that sends uplink communications to the base station. The apparatus may include a configuration component 2012 that receives a configuration, via the reception component 2004, to monitor at least one block of the ULCI, where the configuration indicates at least one of a first block corresponding to a SUL carrier in a cell or a second block corresponding to a NUL carrier in the cell, e.g., as described in connection with 1902. The apparatus may include an application component 2014 that applies a received ULCI (via the reception component 2004) to the SUL carrier to cancel the uplink transmission scheduled at the SUL carrier when the received ULCI comprises an indication in the first block, e.g., as described in connection with 1916. The application component 2014 also applies the received ULCI (via the reception component 2004) to the NUL carrier to cancel the uplink transmission scheduled at the NUL carrier when the received ULCI comprises an indication in the second block, e.g., as described in connection with 1918. The application component 2014 further applies a received ULCI (via the reception component 2004) to the SUL carrier and the NUL carrier to cancel the uplink transmission scheduled at the SUL carrier and the NUL carrier, e.g., as described in connection with 1916 and 1918.

The configuration component 2012 further receives a configuration (via the reception component 2004) to monitor a block of the ULCI for a cell, where the block is associated with a SUL carrier in the cell or a NUL carrier in the cell, e.g., as described in connection with 1902. The application component 2014 further applies a received ULCI to the SUL carrier and to the NUL carrier, where the UE punctures or cancels the uplink transmission scheduled at resources indicated in the ULCI, e.g., as described in connection with 1916, 19118. The apparatus 2002 may further include a cancellation component 2016 that cancels at least a portion of the uplink transmission based on a received ULCI, e.g., as described in connection with 1920. The configuration component 2012 further receives a first configuration (via the reception component 2004) for a SUL carrier to perform at least one of stopping the uplink transmission without resuming, stopping the uplink transmission with resuming, or reducing transmission power in response to a received ULCI, e.g., as described in connection with 1904. The configuration component 2012 further receives a second configuration (via the reception component 2004) for a NUL carrier to perform at least one of stopping the uplink transmission without resuming, stopping the uplink transmission with resuming, or reducing the transmission power in response to the received ULCI, where the first configuration for the SUL carrier is different than the second configuration for the NUL carrier, e.g., as described in connection with 1906.

The apparatus may include additional components that perform each of the blocks of the algorithm in the aforementioned flowcharts of FIGS. 18 and 19. As such, each block in the aforementioned flowcharts of FIGS. 18 and 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 21:
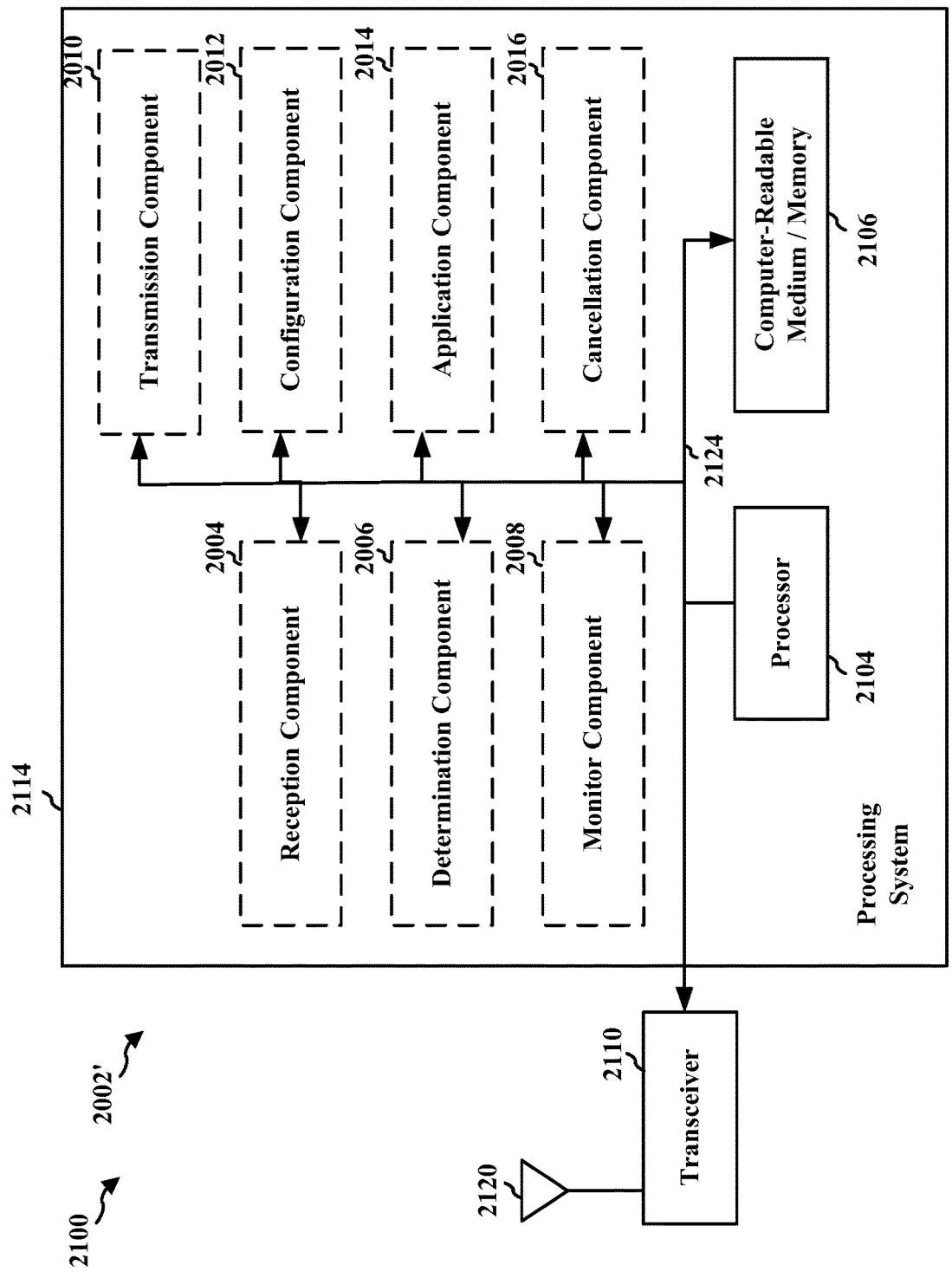
FIG. 21 is a diagram illustrating an example of a hardware implementation for an apparatus employing a processing system.

FIG. 21 is a diagram 2100 illustrating an example of a hardware implementation for an apparatus 2002' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware components, represented by the processor 2104, the components 2004, 2006, 2008, 2010, 2012, 2014, 2016 and the computer-readable medium/memory 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the reception component 2004. In addition, the transceiver 2110 receives information from the processing system 2114, specifically the transmission component 2010, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106. The software, when executed by the processor 2104, causes the processing system 2114 to perform the various functions described supra for any particular apparatus. The computer-readable medium/memory 2106 may also be used for storing data that is manipulated by the processor 2104 when executing software. The processing system 2114 further includes at least one of the components 2004, 2006, 2008, 2010, 2012, 2014, 2016. The components may be software components running in the processor 2104, resident/stored in the computer readable medium/memory 2106, one or more hardware components coupled to the processor 2104, or some combination thereof. The processing system 2114 may be a component of the UE 350 and may include the memory 360 and/or at least one of the TX processor 368, the RX processor 356, and the controller/processor 359. Alternatively, the processing system 2114 may be the entire UE (e.g., see 350 of FIG. 3).

In one configuration, the apparatus 2002/2002' for wireless communication includes means for receiving scheduling information for an uplink transmission from a base station; and means for determining whether to monitor at least one uplink cancellation indication (ULCI) occasion from the base station based on the scheduling information and based on a separation in time between the scheduling information and the ULCI occasion.

In one configuration, the apparatus 2002/2002' may further include means for monitoring the at least one ULCI occasion based on a determination that the at least one ULCI occasion is valid.

In one configuration, the apparatus 2002/2002' may further include means for receiving scheduling information for an uplink transmission from a base station; means for determining whether to monitor at least one uplink cancellation indication (ULCI) occasion from the base station based on the scheduling information; and means for receiving a configuration to monitor at least one block of the ULCI, wherein the configuration indicates at least one of a first block corresponding to a supplementary uplink (SUL) carrier in a cell or a second block corresponding to a non-supplementary uplink (NUL) carrier in the cell.

In one configuration, the apparatus 2002/2002' may further include means for applying a received ULCI to the SUL carrier to cancel the uplink transmission scheduled at the SUL carrier when a received ULCI comprises an indication in the first block; or, in one configuration, means for applying the received ULCI to the NUL carrier to cancel the uplink transmission scheduled at the NUL carrier when the received ULCI comprises an indication in the second block.

In one configuration, the apparatus 2002/2002' may further include means for applying a received ULCI to the SUL carrier and the NUL carrier to cancel the uplink transmission scheduled at the SUL carrier and the NUL carrier.

In one configuration, the apparatus 2002/2002' may further include means for receiving a configuration to monitor a block of the ULCI for a cell, wherein the block is associated with a supplementary uplink (SUL) carrier in the cell or a non-supplementary uplink (NUL) carrier in the cell.

In one configuration, the apparatus 2002/2002' may further include means for applying a received ULCI to the SUL carrier and to the NUL carrier, wherein the UE punctures or cancels the uplink transmission scheduled at resources indicated in the ULCI.

In one configuration, the apparatus 2002/2002' may further include means for canceling at least a portion of the uplink transmission based on a received ULCI.

In one configuration, the apparatus 2002/2002' may further include means for receiving a first configuration for a supplementary uplink (SUL) carrier to perform at least one of stopping the uplink transmission without resuming, stopping the uplink transmission with resuming, or reducing transmission power in response to a received ULCI.

In one configuration, the apparatus 2002/2002' may further include means for receiving a second configuration for a non-supplementary uplink (NUL) carrier to perform at least one of stopping the uplink transmission without resuming, stopping the uplink transmission with resuming, or reducing the transmission power in response to the received ULCI, wherein the first configuration for the SUL is different than the second configuration for the NUL.

The aforementioned means may be one or more of the aforementioned components of the apparatus 2002 and/or the processing system 2114 of the apparatus 2002' configured to perform the functions recited by the aforementioned means. As described supra, the processing system 2114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 22:
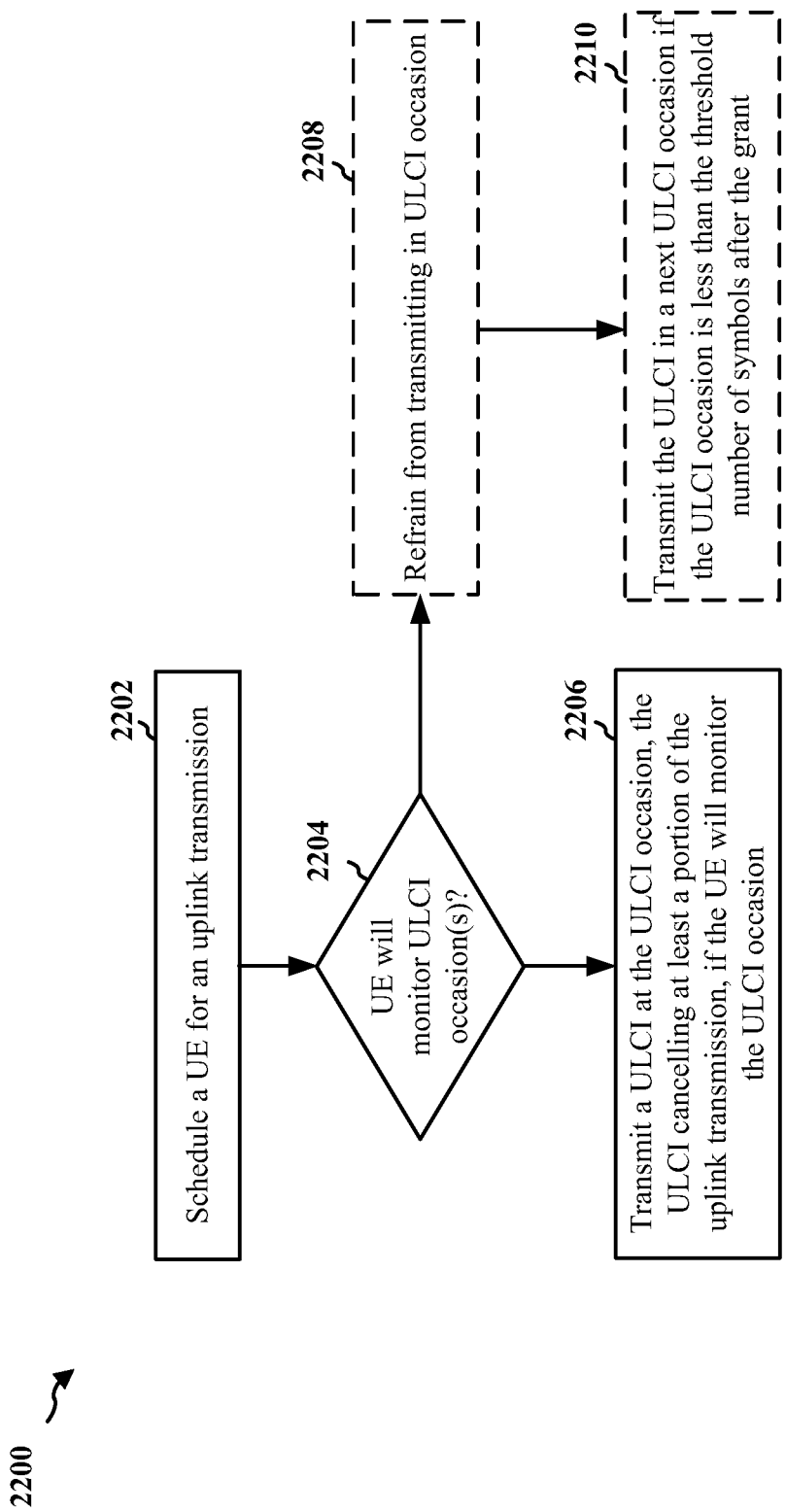
FIG. 22 is a flowchart of a method of wireless communication.

FIG. 22 is a flowchart 2200 of a method of wireless communication. The method may be performed by a base station (e.g., the base station 102/180, 310, 1404, 1504, 1604, 1704); the apparatus 2402/2402'; the processing system 2514, which may include the memory 376 and which may be the entire base station 310 or a component of the base station 310, such as the TX processor 316, the RX processor 370, and/or the controller/processor 375). Optional aspects are illustrated in dashed lines. The method allows a base station to transmit ULCI based on selective monitoring of ULCI occasions by a UE (e.g., the UE 104, 350, 1402, 1502, 1602, 1702), as well as to configure in ULCI whether the uplink transmission to be canceled is carried on NUL or SUL.

At 2202, the base station schedules a UE for an uplink transmission. For example, 2202 may be performed by schedule component 2406. For instance, referring to FIG. 14, the base station 1404 schedules an uplink transmission (e.g. eMBB data) of the UE 1402 and sends scheduling information 1406 informing the UE of the uplink transmission. The UE receives the scheduling information from the base station. Similar operations are performed in FIGS. 15, 16, and 17.

At 2204, the base station determines whether the UE will monitor a ULCI occasion for the uplink transmission. For example, 2204 may be performed by determination component 2408. For instance, referring to FIG. 14, the base station 1404 may determine whether the UE 1402 will monitor the ULCI occasion (1410) for the uplink transmission. For example, the UE may determine to monitor the ULCI occasion if the base station has previously scheduled an uplink transmission for the UE that could potentially be punctured or canceled by an ULCI and having at least one symbol falling into a corresponding window for the ULCI occasion, as described above in the first aspect with reference to FIGS. 6 and 7. Similarly, at FIG. 15, the base station 1504 may determine whether the UE 1502 will monitor the ULCI occasion (1510) for the uplink transmission. For example, the UE 1502 may determine to monitor the ULCI occasion if the UE receives the dynamically scheduled uplink grant at least a certain number of symbols earlier than the ULCI occasion associated with the uplink transmission, as described above in the second aspect with reference to FIGS. 8 and 9.

In one aspect, the ULCI occasion is associated with a corresponding set of time-domain resources for the uplink transmission being canceled. For example, referring to FIG. 6, a UE may potentially receive multiple ULCI occasions 602, 604, 606, 608, 610, 612 from a base station that each correspond to individual windows 614, 616, 618, etc. of a combined set of resources 620 for use by uplink transmissions 622, 624. Thus, ULCI occasion 602 may be associated with the set of time domain resources within window 614, ULCI occasion 604 may be associated with the set of time domain resources within window 616, and so forth. Each window may span, for instance, multiple symbols in the combined set of resources 620.

In another aspect, the base station determines whether the UE will monitor the ULCI occasion for the uplink transmission based on a separation in time between the scheduling and the ULCI occasion. For instance, the base station may determine that the UE will monitor the ULCI occasion when a grant scheduling the uplink transmission is transmitted at least a threshold number of symbols before the ULCI occasion. The threshold number of symbols may be 1 or another number. For example, referring to FIG. 15, at the time that the base station 1504 determines whether the UE 1502 will monitor the ULCI occasion (1510), the base station 1504 has transmitted a dynamically scheduled uplink grant 1506 to UE 1502 at least a threshold number of symbols 1512 (e.g. x symbols, where x=1 or another number) earlier than the starting symbol of the CORESET of ULCI occasion 1514. Therefore, the base station 1504 will determine that the UE will monitor the ULCI occasion 1514. As a result, the base station 1504 will transmit ULCI 1518 in ULCI occasion 1514.

At 2206, the base station transmits an ULCI at the ULCI occasion, the ULCI cancelling at least a portion of the uplink transmission, if the UE will monitor the ULCI occasion. For example, 2206 may be performed by ULCI component 2410 and transmission component 2412. For example, referring to FIG. 14, at the time that the base station 1404 determines whether the UE 1402 will monitor the ULCI occasion (1410), the base station 1404 has previously scheduled an uplink transmission of the UE 1402 that could be potentially be canceled by ULCI (e.g. scheduling information 1406 for eMBB data) having at least one symbol falling within a corresponding window. Therefore, the base station 1404 will determine that the UE will monitor the ULCI occasion 1412. As a result, the UE will monitor the ULCI occasion (1414), the base station 1404 will transmit ULCI 1416 in ULCI occasion 1412, and the UE 1402 will receive the ULCI 1416. Based on the received ULCI 1416, the UE 1402 will cancel its scheduled uplink transmission (1418), as indicated by canceled uplink transmission 1420.

In one aspect, the base station refrains from transmitting the ULCI in the ULCI occasion when the base station determines that UE will not to monitor the ULCI occasion. For example, referring to FIG. 14, at the time the base station 1404 determines whether the UE will monitor a subsequent ULCI occasion (1424), the base station 1404 has not scheduled a subsequent uplink transmission. As a result, the UE 1402 will skip monitoring this ULCI occasion (1428), and the base station will refrain from transmitting ULCI (1430) in ULCI occasion 1426. Similarly with reference to FIG. 15, at the time the base station 1504 determines whether the UE will monitor the next ULCI occasion (1528), the base station may determine that the dynamically scheduled uplink grant 1524 will be received by UE 1502 less than the threshold number of symbols 1512 earlier than the starting symbol of the CORESET of ULCI occasion 1530. As a result, the UE 1502 will skip monitoring the next ULCI occasion (1532), and the base station will refrain from transmitting ULCI (1534) in ULCI occasion 1530.

As illustrated at 2208, the base station may refrain from transmitting ULCI to a UE in a particular ULCI occasion if the base station determines, at 2204, that the UE will not monitor the ULCI occasion.

Finally, at 2210, the base station transmits the ULCI in a next ULCI occasion if the ULCI occasion is less than the threshold number of symbols after the grant. For example, 2210 may be performed by ULCI component 2410 and transmission component 2412. For example, referring to FIG. 15, at the time the base station 1504 determines whether the UE will monitor the next ULCI occasion (1528), the base station may determine that the dynamically scheduled uplink grant 1524 will be received by UE 1502 less than the threshold number of symbols 1512 earlier than the starting symbol of the CORESET of ULCI occasion 1530. As a result, the UE 1502 will skip monitoring the next ULCI occasion (1532), and the base station will refrain from transmitting ULCI (1534) in ULCI occasion 1530. Instead, the base station 1504 may transmit the ULCI 1536 for the uplink transmission in the next ULCI occasion 1538 which the UE may monitor.

Figure 23:
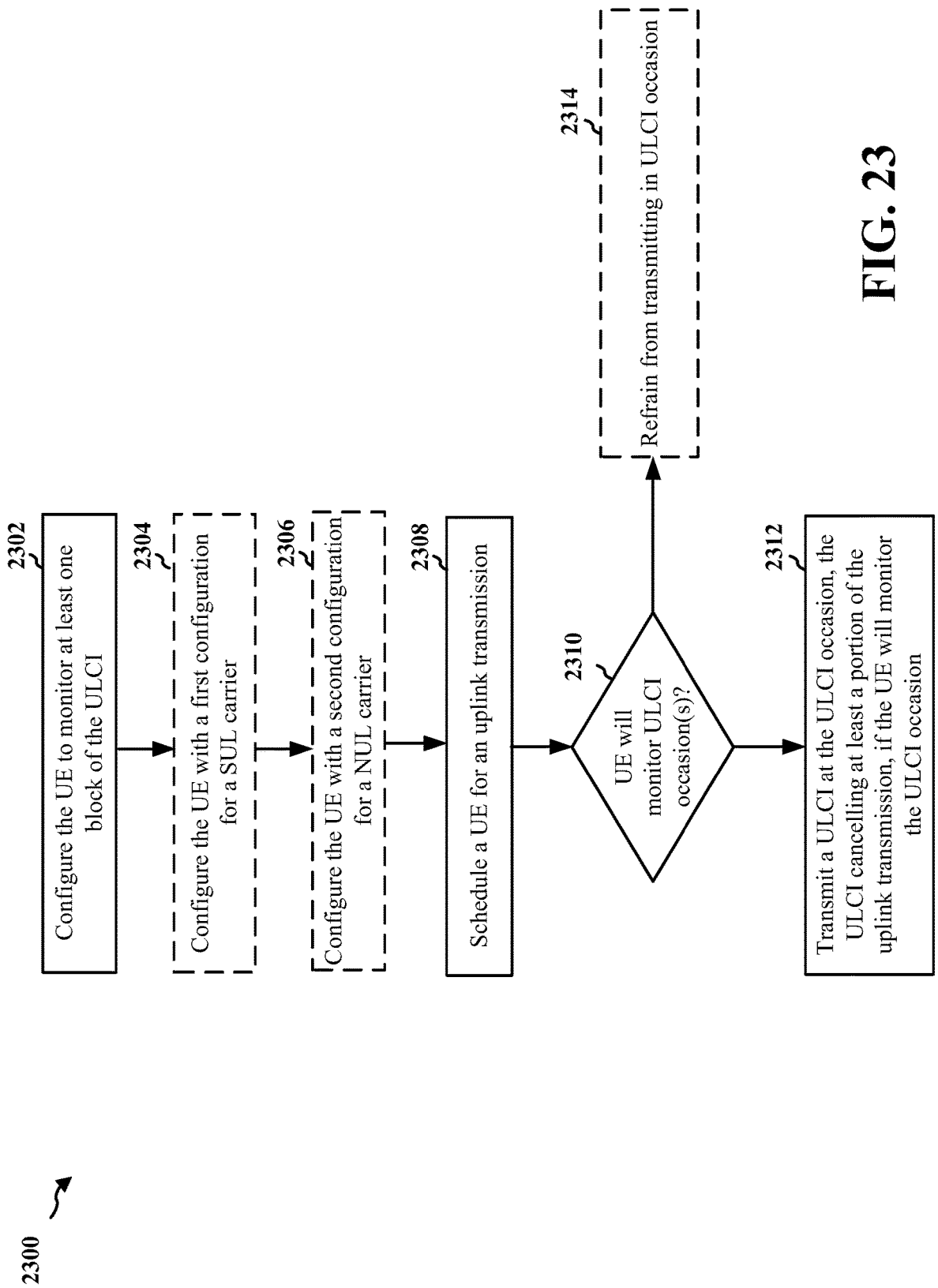
FIG. 23 is a flowchart of a method of wireless communication.

FIG. 23 is a flowchart 2300 of a method of wireless communication. The method may be performed by a base station (e.g., the base station 102/180, 310, 1404, 1504, 1604, 1704); the apparatus 2402/2402'; the processing system 2514, which may include the memory 376 and which may be the entire base station 310 or a component of the base station 310, such as the TX processor 316, the RX processor 370, and/or the controller/processor 375). Optional aspects are illustrated in dashed lines. The method allows a base station to configure in ULCI whether the uplink transmission to be canceled is carried on NUL or SUL, as well as to transmit ULCI based on selective monitoring of ULCI occasions by a UE (e.g., the UE 104, 350, 1402, 1502, 1602, 1702).

At 2308, the base station schedules a UE for an uplink transmission. For example, 2202 may be performed by schedule component 2406. 2208 may correspond to 2202 of FIG. 22, which is described above.

At 2310, the base station determines whether the UE will monitor a ULCI occasion for the uplink transmission. For example, 2310 may be performed by determination component 2408. 2310 may correspond to 2204 of FIG. 22, which is described above.

At 2312, the base station transmits an ULCI at the ULCI occasion, the ULCI cancelling at least a portion of the uplink transmission, if the UE will monitor the ULCI occasion. For example, 2312 may be performed by ULCI component 2410 and transmission component 2412. Otherwise, as illustrated at 2314, the base station may refrain from transmitting ULCI to a UE in a particular ULCI occasion if the base station determines, at 2310, that the UE will not monitor the ULCI occasion. 2312 and 2314 may respectively correspond to 2206 and 2208 of FIG. 22, which are described above.

At 2302, the base station configures the UE to monitor at least one block of the ULCI. For example, 2302 may be performed by configuration component 2414. The configuring may indicate at least one of a first block corresponding to a SUL carrier in a cell or a second block corresponding to a NUL carrier in the cell. In certain aspects, the first block corresponding to the SUL carrier is separate from the second block corresponding to the NUL carrier. In other aspects, the first block corresponding to the SUL carrier is the same as the second block corresponding to the NUL carrier. For example, referring to FIG. 16, the base station may configure separate blocks of ULCI (1612) for the UE to monitor, where each block corresponds to either SUL or NUL, as described above in the third aspect with respect to FIG. 11. For example, the base station 1604 may configure one or two blocks (e.g. block two 1106 and block six 1108 of FIG. 11 in DCI 1102) as corresponding to the carrier(s) on which the uplink transmission is scheduled (e.g. NUL or SUL). In certain aspects, the base station may configure the same block (for example, block two 1106 in FIG. 11) for both SUL or NUL.

In a further aspect, the base station may cancel the portion of the uplink transmission in only one of a first block corresponding to a supplementary uplink (SUL) carrier in a cell or a second block corresponding to a non-supplementary uplink (NUL) carrier in the cell. For example, referring to FIG. 16, the base station 1604 transmits ULCI 1614 including the configured block(s) in ULCI occasion 1610. Based on the received ULCI 1614, the UE 1602 applies the ULCI 1614 to the SUL carrier (1616) and to the NUL carrier (1618) to cancel at least a portion of its scheduled uplink transmission on the carrier and resources indicated in the configured block. Thus, the base station may cancel SUL uplink transmission 1620 or NUL uplink transmission 1622.

At 2304, the base station may configure the UE with a first configuration for a SUL carrier to perform at least one of stopping the uplink transmission without resuming, stopping the uplink transmission with resuming, or reducing transmission power in response to a received ULCI. Similarly, at 2306, the base station may configure the UE with a second configuration for a NUL carrier to perform at least one of stopping the uplink transmission without resuming, stopping the uplink transmission with resuming, or reducing the transmission power in response to the received ULCI, wherein the first configuration for the SUL is different than the second configuration for the NUL. For example, 2304 and 2306 may be performed by configuration component 2414. For instance, referring to FIG. 17, the base station 1704 may send a SUL behavior configuration 1718 and a NUL behavior configuration 1720 to UE 1702 indicating that the UE may perform one or more of the following actions when cancelling its uplink transmission on the SUL or NUL, respectively: stopping the transmission without resuming, stopping the transmission with resuming, or reducing transmission power. The SUL behavior configuration 1718 and/or NUL behavior configuration 1720 may be included in the uplink grant 1706, the ULCI 1714, or in separate message(s) as illustrated in FIG. 17.

Figure 24:
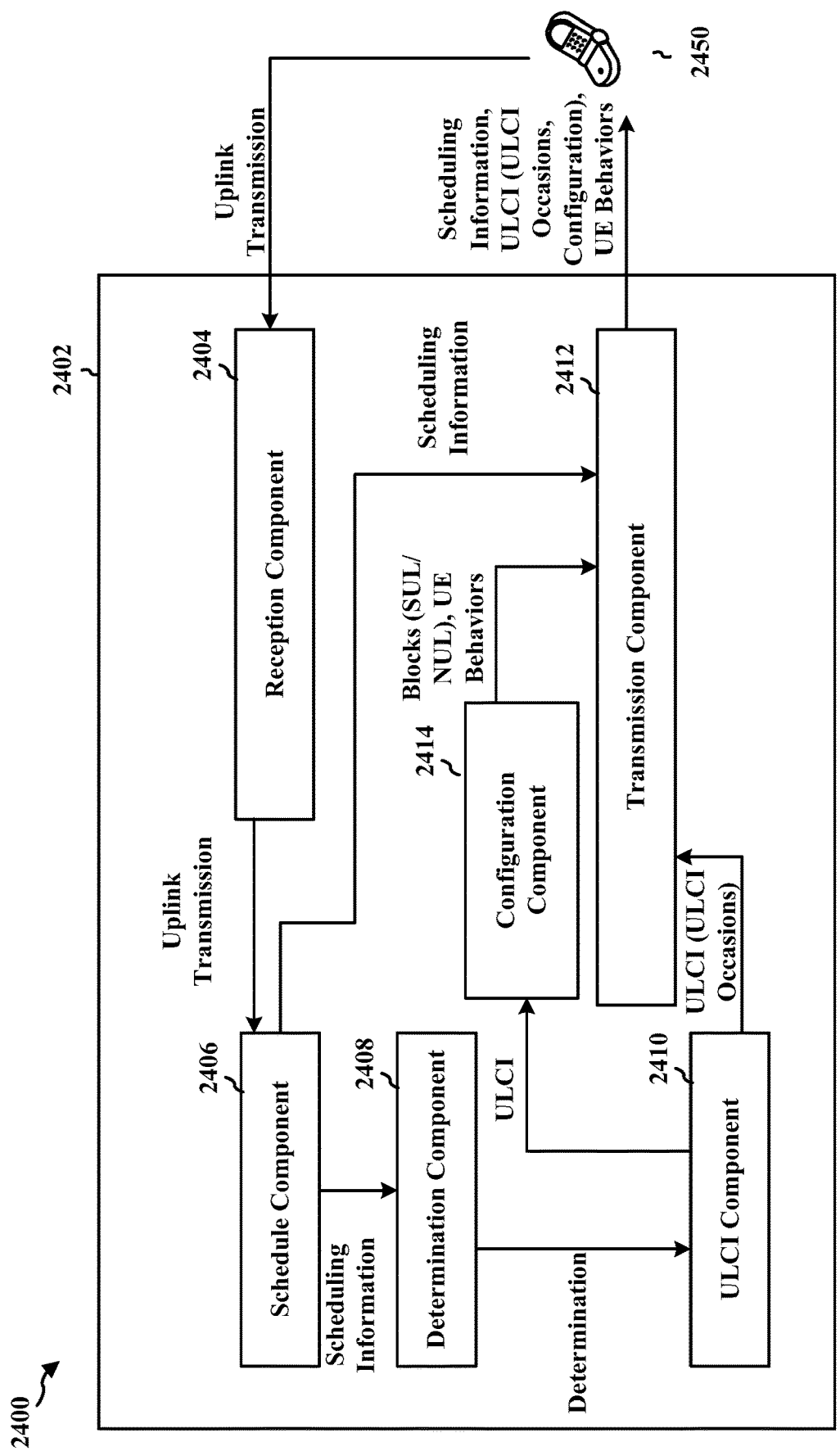
FIG. 24 is a conceptual data flow diagram illustrating the data flow between different means/components in an example apparatus.

FIG. 24 is a conceptual data flow diagram 2400 illustrating the data flow between different means/components in an example apparatus 2402. The apparatus may be a base station (e.g. base station 102/180, 310, 1404, 1504, 1604, 1704). The apparatus includes a reception component 2404 that receives uplink transmissions from a UE 2450 (e.g. UE 104, 350, 1402, 1502, 1602, 1702). The apparatus includes a schedule component 2406 that schedules a UE for an uplink transmission, e.g., as described in connection with 2202 and 2308. The apparatus includes a determination component 2408 that determines whether the UE will monitor a ULCI occasion for the uplink transmission, e.g., as described in connection with 2204 and 2310. The apparatus includes a ULCI component 2410 that transmits, via a transmission component 2412 of apparatus 2402, an ULCI at the ULCI occasion, the ULCI cancelling at least a portion of the uplink transmission, if the UE will monitor the ULCI occasion, e.g., as described in connection with 2206 and 2312. The ULCI component 2410 may also transmit, via the transmission component 2412, the ULCI in a next ULCI occasion if the ULCI occasion is less than the threshold number of symbols after the grant scheduling the uplink transmission, e.g., as described in connection with 2210. The apparatus may include a configuration component 2414 that configures the UE to monitor at least one block of the ULCI, e.g., as described in connection with 2302. The configuration component 2414 may also configure the UE with a first configuration for a SUL carrier to perform at least one of stopping the uplink transmission without resuming, stopping the uplink transmission with resuming, or reducing transmission power in response to a received ULCI, e.g., as described in connection with 2304. Furthermore, the configuration component 2414 may configure the UE with a second configuration for a NUL carrier to perform at least one of stopping the uplink transmission without resuming, stopping the uplink transmission with resuming, or reducing the transmission power in response to the received ULCI, where the first configuration for the SUL is different than the second configuration for the NUL, e.g., as described in connection with 2306. The transmission component 2412 may transmit the scheduling information from schedule component 2406, the ULCI from ULCI component 2410, and the configurations from configuration component 2414 to the UE.

The apparatus may include additional components that perform each of the blocks of the algorithm in the aforementioned flowcharts of FIGS. 22 and 23. As such, each block in the aforementioned flowcharts of FIGS. 22 and 23 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 25:
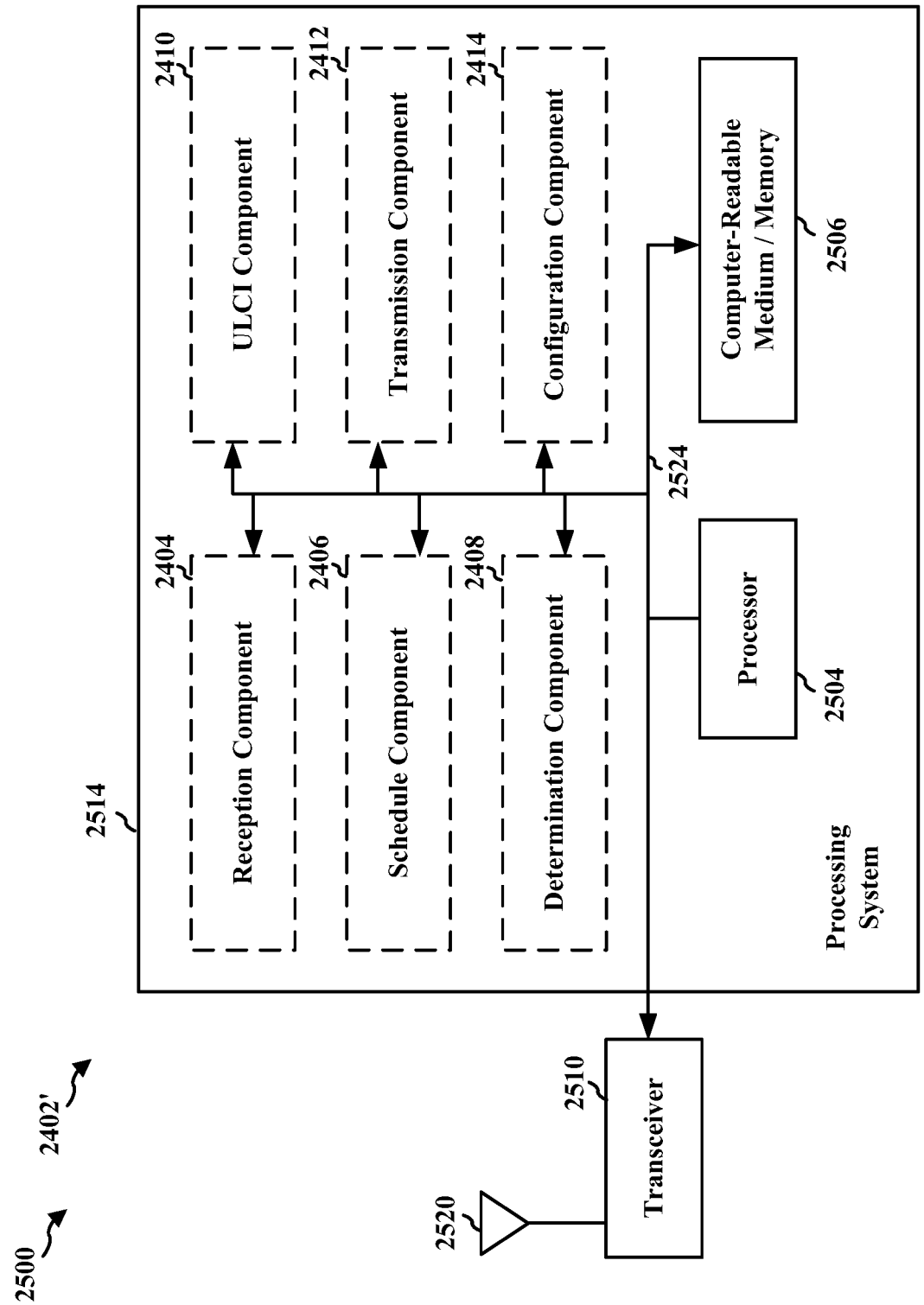
FIG. 25 is a diagram illustrating an example of a hardware implementation for an apparatus employing a processing system.

FIG. 25 is a diagram 2500 illustrating an example of a hardware implementation for an apparatus 2402' employing a processing system 2514. The processing system 2514 may be implemented with a bus architecture, represented generally by the bus 2524. The bus 2524 may include any number of interconnecting buses and bridges depending on the specific application of the processing system 2514 and the overall design constraints. The bus 2524 links together various circuits including one or more processors and/or hardware components, represented by the processor 2504, the components 2404, 2406, 2408, 2410, 2412, 2414 and the computer-readable medium/memory 2506. The bus 2524 may also link various other circuits such as timing sources, peripherals, voltage regulators, and power management circuits, which are well known in the art, and therefore, will not be described any further.

The processing system 2514 may be coupled to a transceiver 2510. The transceiver 2510 is coupled to one or more antennas 2520. The transceiver 2510 provides a means for communicating with various other apparatus over a transmission medium. The transceiver 2510 receives a signal from the one or more antennas 2520, extracts information from the received signal, and provides the extracted information to the processing system 2514, specifically the reception component 2404. In addition, the transceiver 2510 receives information from the processing system 2514, specifically the transmission component 2412, and based on the received information, generates a signal to be applied to the one or more antennas 2520. The processing system 2514 includes a processor 2504 coupled to a computer-readable medium/memory 2506. The processor 2504 is responsible for general processing, including the execution of software stored on the computer-readable medium/memory 2506. The software, when executed by the processor 2504, causes the processing system 2514 to perform the various functions described supra for any particular apparatus. The computer-readable medium/memory 2506 may also be used for storing data that is manipulated by the processor 2504 when executing software. The processing system 2514 further includes at least one of the components 2404, 2406, 2408, 2410, 2412, 2414. The components may be software components running in the processor 2504, resident/stored in the computer readable medium/memory 2506, one or more hardware components coupled to the processor 2504, or some combination thereof. The processing system 2514 may be a component of the base station 310 and may include the memory 376 and/or at least one of the TX processor 316, the RX processor 370, and the controller/processor 375. Alternatively, the processing system 2514 may be the entire base station (e.g., see 310 of FIG. 3).

In one configuration, the apparatus 2402/2402' for wireless communication includes means for scheduling a user equipment (UE) for an uplink transmission; means for determining whether the UE will monitor an uplink cancellation indication (ULCI) occasion for the uplink transmission based on a separation in time between the scheduling and the ULCI occasion; and means for transmitting an ULCI at the ULCI occasion, the ULCI cancelling at least a portion of the uplink transmission, if the UE will monitor the ULCI occasion.

In one configuration, the apparatus 2402/2402' may further include means for transmitting the ULCI in a next ULCI occasion if the ULCI occasion is less than the threshold number of symbols after the grant.

In one configuration, the apparatus 2402/2402' further includes means for configuring a UE to monitor at least one block of a ULCI, wherein the configuring indicates at least one of a first block corresponding to a SUL carrier in a cell or a second block corresponding to a NUL carrier in the cell; means for scheduling the UE for an uplink transmission; means for determining whether the UE will monitor an uplink cancellation indication (ULCI) occasion for the uplink transmission; and means for transmitting an ULCI at the ULCI occasion, the ULCI cancelling at least a portion of the uplink transmission, if the UE will monitor the ULCI occasion.

In one configuration, the apparatus 2402/2402' may further include means for configuring the UE with a first configuration for a supplementary uplink (SUL) carrier to perform at least one of stopping the uplink transmission without resuming, stopping the uplink transmission with resuming, or reducing transmission power in response to a received ULCI; and means for configuring the UE with a second configuration for a non-supplementary uplink (NUL) carrier to perform at least one of stopping the uplink transmission without resuming, stopping the uplink transmission with resuming, or reducing the transmission power in response to the received ULCI, wherein the first configuration for the SUL is different than the second configuration for the NUL.

The aforementioned means may be one or more of the aforementioned components of the apparatus 2402 and/or the processing system 2514 of the apparatus 2402' configured to perform the functions recited by the aforementioned means. As described supra, the processing system 2514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and may be combined with aspects of other embodiments or teaching described herein, without limitation.

Example 1 is a method of wireless communication at a UE, comprising: receiving scheduling information for an uplink transmission from a base station; and determining whether to monitor at least one uplink cancellation indication (ULCI) occasion from the base station based on the scheduling information and based on a separation in time between the scheduling information and the ULCI occasion.

In Example 2, the method of Example 1 further includes that the uplink transmission for the UE is dynamically scheduled.

In Example 3, the method of Example 1 or 2 further includes that the UE determines to monitor the at least one ULCI occasion when the scheduling information is received a threshold number of symbols before the at least one ULCI occasion.

In Example 4, the method of any of Example 1-3 further includes that the threshold number of symbols is 1.

In Example 5, the method of any of Example 1-4 further includes monitoring the at least one ULCI occasion based on a determination that the at least one ULCI occasion is valid.

In Example 6, the method of any of Example 1-5 further includes that the UE determines to skip monitoring the at least one ULCI occasion when the UE has not been scheduled for a corresponding uplink transmission.

In Example 7, the method of any of Example 1-6 further includes that the UE determines to monitor the at least one ULCI occasion when the scheduling information schedules the UE for the uplink transmission.

In Example 8, the method of any of Example 1-7 further includes that each ULCI occasion is associated with a corresponding set of time-domain resources for the uplink transmission, and that the UE determines to monitor an ULCI occasion when the UE is scheduled for the uplink transmission in at least one symbol of the corresponding set of time-domain resources associated with the ULCI occasion.

In Example 9, the method of any of Example 1-8 further includes that the UE determines the corresponding set of time domain resources associated with the ULCI occasion as a union of multiple configured time domain resources associated with the ULCI occasion.

In Example 10, the method of any of Example 1-9 further includes that the UE determines to skip monitoring for the ULCI occasion when the UE is not scheduled for the uplink transmission in any symbol of the corresponding set of time-domain resources associated with the ULCI occasion.

In Example 11, the method of any of Example 1-10 further includes that the corresponding sets of time-domain resources overlap in time.

In Example 12, the method of any of Example 1-11 further includes that if the uplink transmission is canceled in an ULCI in a first ULCI occasion associated with the corresponding sets of time-domain resources that overlap in time, the UE determines not to monitor a second ULCI occasion associated with the corresponding sets of time-domain resources that overlap in time.

In Example 13, the method of any of Example 1-12 further includes that the UE determines to skip monitoring for the ULCI occasion when the UE is scheduled for the uplink transmission, and wherein the uplink transmission is limited from being punctured based on a ULCI.

In Example 14, the method of any of Example 1-13 further includes that the uplink transmission is scheduled on a same cell as the ULCI occasion.

In Example 15, the method of any of Example 1-14 further includes that the uplink transmission is scheduled on a different cell than the ULCI occasion.

In Example 16, the method of any of Example 1-15 further includes that more than one ULCI occasion is associated with different portions of the same uplink transmission.

In Example 17, the method of any of Example 1-16 further includes that if a first portion of the uplink transmission is canceled by a first ULCI in a first ULCI occasion and the UE cancels a second portion of the uplink transmission that corresponds to a second ULCI occasion, the UE determines not to monitor the second ULCI occasion.

Example 18 is a device including one or more processors and one or more memories in electronic communication with the one or more processors storing instructions executable by the one or more processors to cause the system or apparatus to implement a method as in any of Examples 1-17.

Example 19 is a system or apparatus including means for implementing a method or realizing an apparatus as in any of Examples 1-17.

Example 20 is a non-transitory computer readable medium storing instructions executable by one or more processors to cause the one or more processors to implement a method as in any of Examples 1-17.

Example 21 is a method of wireless communication at a UE, comprising: receiving scheduling information for an uplink transmission from a base station; determining whether to monitor at least one uplink cancellation indication (ULCI) occasion from the base station based on the scheduling information; wherein an ULCI comprises multiple blocks; and receiving a configuration to monitor at least one block of the ULCI, wherein the configuration indicates at least one of a first block corresponding to a supplementary uplink (SUL) carrier in a cell or a second block corresponding to a non-supplementary uplink (NUL) carrier in the cell.

In Example 22, the method of Example 21 further includes that the first block corresponding to the SUL carrier is separate from the second block corresponding to the NUL carrier.

In Example 23, the method of Example 21 or 22 further includes applying a received ULCI to the SUL carrier to cancel the uplink transmission scheduled at the SUL carrier when the received ULCI comprises a first indication in the first block; or applying the received ULCI to the NUL carrier to cancel the uplink transmission scheduled at the NUL carrier when the received ULCI comprises a second indication in the second block.

In Example 24, the method of any of Example 21-23 further includes that the first block corresponding to the SUL carrier is the same as the second block corresponding to the NUL carrier.

In Example 25, the method of any of Example 21-24 further includes applying a received ULCI to the SUL carrier and the NUL carrier to cancel the uplink transmission scheduled at the SUL carrier and the NUL carrier.

In Example 26, the method of any of Example 21-25 further includes, wherein an ULCI comprises multiple blocks, receiving a configuration to monitor a block of the ULCI for a cell, wherein the block is associated with the SUL carrier in the cell or the NUL carrier in the cell.

In Example 27, the method of any of Example 21-26 further includes that the configuration indicates whether the ULCI is associated with the SUL carrier or the NUL carrier.

In Example 28, the method of any of Example 21-27 further includes applying a received ULCI to the SUL carrier and to the NUL carrier, wherein the UE punctures or cancels the uplink transmission scheduled at resources indicated in the ULCI.

In Example 29, the method of any of Example 21-28 further includes canceling at least a portion of the uplink transmission based on a received ULCI.

In Example 30, the method of any of Example 21-29 further includes receiving a first configuration for the SUL carrier to perform at least one of stopping the uplink transmission without resuming, stopping the uplink transmission with resuming, or reducing transmission power in response to a received ULCI; and receiving a second configuration for the NUL carrier to perform at least one of stopping the uplink transmission without resuming, stopping the uplink transmission with resuming, or reducing the transmission power in response to the received ULCI, wherein the first configuration for the SUL carrier is different than the second configuration for the NUL carrier.

Example 31 is a device including one or more processors and one or more memories in electronic communication with the one or more processors storing instructions executable by the one or more processors to cause the system or apparatus to implement a method as in any of Examples 21-30.

Example 32 is a system or apparatus including means for implementing a method or realizing an apparatus as in any of Examples 21-30.

Example 33 is a non-transitory computer readable medium storing instructions executable by one or more processors to cause the one or more processors to implement a method as in any of Examples 21-30.

Example 34 is a method of wireless communication at a base station, comprising: scheduling a user equipment (UE) for an uplink transmission; determining whether the UE will monitor an uplink cancellation indication (ULCI) occasion for the uplink transmission based on a separation in time between the scheduling and the ULCI occasion; and transmitting an ULCI at the ULCI occasion, the ULCI cancelling at least a portion of the uplink transmission, if the UE will monitor the ULCI occasion.

In Example 35, the method of Example 34 further includes that the base station determines that the UE will monitor the ULCI occasion when a grant scheduling the uplink transmission is transmitted at least a threshold number of symbols before the ULCI occasion.

In Example 36, the method of Example 34 or 35 further includes transmitting the ULCI in a next ULCI occasion if the ULCI occasion is less than the threshold number of symbols after the grant.

In Example 37, the method of any of Example 34-36 further includes that the threshold number of symbols is 1.

In Example 38, the method of any of Example 34-37 further includes refraining from transmitting the ULCI in the ULCI occasion when the base station determines that the UE will not monitor the ULCI occasion.

In Example 39, the method of any of Example 34-38 further includes that the ULCI occasion is associated with a corresponding set of time-domain resources for the uplink transmission being canceled.

Example 40 is a device including one or more processors and one or more memories in electronic communication with the one or more processors storing instructions executable by the one or more processors to cause the system or apparatus to implement a method as in any of Examples 34-39.

Example 41 is a system or apparatus including means for implementing a method or realizing an apparatus as in any of Examples 34-39.

Example 42 is a non-transitory computer readable medium storing instructions executable by one or more processors to cause the one or more processors to implement a method as in any of Examples 34-39.

Example 43 is a method of wireless communication at a base station, comprising: configuring a user equipment (UE) to monitor at least one block of an uplink cancellation indication (ULCI), wherein the configuring indicates at least one of a first block corresponding to a supplementary uplink (SUL) carrier in a cell or a second block corresponding to a non-supplementary uplink (NUL) carrier in the cell; scheduling the UE for an uplink transmission; determining whether the UE will monitor an ULCI occasion for the uplink transmission; and transmitting the ULCI at the ULCI occasion, the ULCI cancelling at least a portion of the uplink transmission, if the UE will monitor the ULCI occasion.

In Example 44, the method of Example 43 further includes that the first block corresponding to the SUL carrier is separate from the second block corresponding to the NUL carrier.

In Example 45, the method of Example 43 or 44 further includes that the first block corresponding to the SUL carrier is the same as the second block corresponding to the NUL carrier.

In Example 46, the method of any of Example 43-45 further includes that the base station cancels the portion of the uplink transmission in only one of a first block corresponding to the SUL carrier in a cell or a second block corresponding to the NUL carrier in the cell.

In Example 47, the method of any of Example 43-46 further includes configuring the UE with a first configuration for the SUL carrier to perform at least one of stopping the uplink transmission without resuming, stopping the uplink transmission with resuming, or reducing transmission power in response to a received ULCI; and configuring the UE with a second configuration for the NUL carrier to perform at least one of stopping the uplink transmission without resuming, stopping the uplink transmission with resuming, or reducing the transmission power in response to the received ULCI, wherein the first configuration for the SUL carrier is different than the second configuration for the NUL carrier.

Example 48 is a device including one or more processors and one or more memories in electronic communication with the one or more processors storing instructions executable by the one or more processors to cause the system or apparatus to implement a method as in any of Examples 43-47.

Example 49 is a system or apparatus including means for implementing a method or realizing an apparatus as in any of Examples 43-47.

Example 50 is a non-transitory computer readable medium storing instructions executable by one or more processors to cause the one or more processors to implement a method as in any of Examples 43-47.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE) comprising:
   receiving scheduling information for an uplink transmission from a base station, the uplink transmission for the UE being dynamically scheduled using downlink control information (DCI); and
   monitoring at least one uplink cancellation indication (ULCI) occasion from the base station based on the scheduling information and based on a separation in time between the scheduling information and the ULCI occasion, wherein the UE monitors the at least one ULCI occasion when the DCI is received a threshold number of symbols before the at least one ULCI occasion, and the threshold number of symbols is 1.

2. The method of claim 1, wherein the UE skips monitoring the at least one ULCI occasion when the DCI is received less than the threshold number of symbols before the at least one ULCI occasion.

3. The method of claim 1, further comprising:
   monitoring the at least one ULCI occasion based on the at least one ULCI occasion being valid.

4. The method of claim 1, wherein the UE skips monitoring the at least one ULCI occasion when the UE has not been scheduled for a corresponding uplink transmission.

5. The method of claim 1, wherein each ULCI occasion is associated with a corresponding set of time-domain resources for the uplink transmission, and wherein the UE monitors an ULCI occasion when the UE is scheduled for the uplink transmission in at least one symbol of the corresponding set of time-domain resources associated with the ULCI occasion.

6. The method of claim 5, wherein the corresponding set of time domain resources associated with the ULCI occasion is based on a union of multiple configured time domain resources associated with the ULCI occasion.

7. The method of claim 5, wherein the UE skips monitoring for the ULCI occasion when the UE is not scheduled for the uplink transmission in any symbol of the corresponding set of time-domain resources associated with the ULCI occasion.

8. The method of claim 5, wherein the corresponding set of time-domain resources is associated with a first ULCI occasion of the at least one ULCI occasion and overlaps in time with a second corresponding set of time-domain resources associated with a second ULCI occasion of the at least one ULCI occasion.

9. The method of claim 8, wherein if the uplink transmission is canceled in an ULCI in the first ULCI occasion associated with the corresponding set of time-domain resources that overlaps in time with the second set of time-domain resources, the UE does not monitor the second ULCI occasion associated with the second corresponding set of time-domain resources.

10. The method of claim 1, wherein the UE skips monitoring for the ULCI occasion when the UE is scheduled for the uplink transmission, and wherein the uplink transmission is limited from being punctured based on an ULCI.

11. The method of claim 10, wherein the uplink transmission comprises one of a physical random access channel (PRACH) or a physical uplink control channel (PUCCH).

12. The method of claim 1, wherein the uplink transmission is scheduled on a same cell as the ULCI occasion.

13. The method of claim 1, wherein the uplink transmission is scheduled on a different cell than the ULCI occasion.

14. The method of claim 1, wherein more than one ULCI occasion is associated with different portions of a same uplink transmission.

15. The method of claim 13, wherein if a first portion of the uplink transmission is canceled by a first ULCI in a first ULCI occasion and the UE cancels a second portion of the uplink transmission that corresponds to a second ULCI occasion, the UE does not monitor the second ULCI occasion.

16. An apparatus for wireless communication, comprising:
means for receiving scheduling information for an uplink transmission from a base station, the uplink transmission being dynamically scheduled using downlink control information (DCI); and
means for monitoring at least one uplink cancellation indication (ULCI) occasion from the base station based on the scheduling information and based on a separation in time between the scheduling information and the ULCI occasion, wherein the means for monitoring is configured to monitor the at least one ULCI occasion when the DCI is received a threshold number of symbols before the at least one ULCI occasion, and the threshold number of symbols is 1.

17. The apparatus of claim 16, wherein the means for monitoring is configured to skip monitoring the at least one ULCI occasion when the DCI is received less than the threshold number of symbols before the at least one ULCI occasion.

18. The apparatus of claim 16, further comprising:
means for monitoring the at least one ULCI occasion based on the at least one ULCI occasion being valid.

19. An apparatus for wireless communication, comprising:
a memory; and
at least one processor coupled to the memory and configured to:
receive scheduling information for an uplink transmission from a base station, the uplink transmission being dynamically scheduled using downlink control information (DCI); and
monitor at least one uplink cancellation indication (ULCI) occasion from the base station based on the scheduling information and based on a separation in time between the scheduling information and the ULCI occasion, wherein the apparatus monitors the at least one ULCI occasion when the DCI is received a threshold number of symbols before the at least one ULCI occasion, and the threshold number of symbols is 1.

20. The apparatus of claim 19, wherein the at least one processor is further configured to skip monitoring the at least one ULCI occasion when the DCI is received less than the threshold number of symbols before the at least one ULCI occasion.

21. The apparatus of claim 19, wherein the at least one processor is further configured to monitor the at least one ULCI occasion based on the at least one ULCI occasion being valid.

22. A non-transitory computer-readable medium storing computer executable code, the code when executed by a processor causes the processor to:
receive scheduling information for an uplink transmission from a base station, the uplink transmission being dynamically scheduled using downlink control information (DCI); and
monitor at least one uplink cancellation indication (ULCI) occasion from the base station based on the scheduling information and based on a separation in time between the scheduling information and the ULCI occasion, wherein the at least one ULCI occasion is monitored when the DCI is received a threshold number of symbols before the at least one ULCI occasion, and the threshold number of symbols is 1.

23. A method of wireless communication at a base station comprising:
scheduling a user equipment (UE) for an uplink transmission, the uplink transmission for the UE being dynamically scheduled using downlink control information (DCI);
transmitting an uplink cancellation indication (ULCI) at an ULCI occasion based on whether the UE will monitor the ULCI occasion for the uplink transmission including a separation in time between the scheduling and the ULCI occasion, the ULCI cancelling at least a portion of the uplink transmission, if the UE will monitor the ULCI occasion; and
transmitting the ULCI in a next ULCI occasion if the ULCI occasion is less than a threshold number of symbols after the DCI, wherein the threshold number of symbols is 1.

24. The method of claim 23, wherein the ULCI occasion is monitored when the DCI scheduling the uplink transmission is transmitted at least the threshold number of symbols before the ULCI occasion.

25. The method of claim 23, further comprising refraining from transmitting the ULCI in the ULCI occasion when the UE will not monitor the ULCI occasion.

26. The method of claim 23, wherein the ULCI occasion is associated with a corresponding set of time-domain resources for the uplink transmission being canceled.

27. An apparatus for wireless communication, comprising:
means for scheduling a user equipment (UE) for an uplink transmission, the uplink transmission for the UE being dynamically scheduled using downlink control information (DCI);
means for transmitting an uplink cancellation indication (ULCI) at an ULCI occasion based on whether the UE will monitor the ULCI occasion for the uplink transmission including a separation in time between the scheduling and the ULCI occasion, the ULCI cancelling at least a portion of the uplink transmission, if the UE will monitor the ULCI occasion; and
means for transmitting the ULCI in a next ULCI occasion if the ULCI occasion is less than a threshold number of symbols after the DCI, wherein the threshold number of symbols is 1.

28. The apparatus of claim 27, wherein the ULCI occasion is monitored when the DCI scheduling the uplink transmission is transmitted at least the threshold number of symbols before the ULCI occasion.

29. An apparatus for wireless communication, comprising:
a memory; and
at least one processor coupled to the memory and configured to:
schedule a user equipment (UE) for an uplink transmission, the uplink transmission for the UE being dynamically scheduled using downlink control information (DCI);
transmit an uplink cancellation indication (ULCI) at an ULCI occasion based on whether the UE will monitor the ULCI occasion for the uplink transmission including a separation in time between the scheduling and the ULCI occasion, the ULCI cancelling at least a portion of the uplink transmission, if the UE will monitor the ULCI occasion; and
transmit the ULCI in a next ULCI occasion if the ULCI occasion is less than a threshold number of symbols after the DCI, wherein the threshold number of symbols is 1.

30. The apparatus of claim 29, wherein the ULCI occasion is monitored when the DCI scheduling the uplink transmission is transmitted at least the threshold number of symbols before the ULCI occasion.

31. A non-transitory computer-readable medium storing computer executable code, the code when executed by a processor causes the processor to:
schedule a user equipment (UE) for an uplink transmission, the uplink transmission for the UE being dynamically scheduled using downlink control information (DCI);
transmit an uplink cancellation indication (ULCI) at an ULCI occasion based on whether the UE will monitor the ULCI occasion for the uplink transmission including a separation in time between the scheduling and the ULCI occasion, the ULCI cancelling at least a portion of the uplink transmission, if the UE will monitor the ULCI occasion; and
transmit the ULCI in a next ULCI occasion if the ULCI occasion is less than a threshold number of symbols after the DCI, wherein the threshold number of symbols is 1.

* * * * *